United States Patent
Sazegar et al.

(10) Patent No.: US 11,700,054 B2
(45) Date of Patent: Jul. 11, 2023

(54) MODULAR METASURFACE ANTENNA WITH HIGH INSTANTANEOUS BANDWIDTH

(71) Applicant: Kymeta Corporation, Redmond, WA (US)

(72) Inventors: Mohsen Sazegar, Kirkland, WA (US); Maxwell A. Smoot, Seattle, WA (US)

(73) Assignee: Kymeta Corporation, Redmond, WA (US)

( * ) Notice: Subject to any disclaimer, the term of this patent is extended or adjusted under 35 U.S.C. 154(b) by 0 days.

(21) Appl. No.: 17/174,095

(22) Filed: Feb. 11, 2021

(65) Prior Publication Data
US 2021/0258069 A1    Aug. 19, 2021

Related U.S. Application Data

(60) Provisional application No. 62/977,006, filed on Feb. 14, 2020.

(51) Int. Cl.
| | | |
|---|---|---|
| *H04B 7/185* | (2006.01) | |
| *H04B 7/08* | (2006.01) | |
| *H01Q 3/26* | (2006.01) | |
| *H01Q 21/00* | (2006.01) | |

(52) U.S. Cl.
CPC ....... *H04B 7/18515* (2013.01); *H01Q 3/2682* (2013.01); *H01Q 21/0025* (2013.01); *H04B 7/0874* (2013.01)

(58) Field of Classification Search
CPC .. H04B 7/18515; H04B 7/0874; H04B 7/084; H04B 7/18517; H01Q 3/2682; H01Q 21/0025
See application file for complete search history.

(56) References Cited

U.S. PATENT DOCUMENTS

| | | | |
|---|---|---|---|
| 10,249,950 B1* | 4/2019 | Arnitz | H01Q 3/44 |
| 10,396,444 B2* | 8/2019 | Levy | H01Q 21/22 |
| 2002/0063657 A1 | 5/2002 | Shuch | |
| 2018/0069321 A1 | 3/2018 | Milroy et al. | |
| 2018/0219286 A1* | 8/2018 | Lee | H01Q 3/2682 |
| 2018/0342810 A1* | 11/2018 | Yu | H01Q 15/008 |
| 2019/0074587 A1 | 3/2019 | Black et al. | |

(Continued)

FOREIGN PATENT DOCUMENTS

| | | | |
|---|---|---|---|
| CN | 208723094 U | * | 4/2019 |
| JP | 2009239527 A | * | 10/2009 |

OTHER PUBLICATIONS

International Search Report and Written Opinion on the Patentability of Application No. PCT/US2021/018039 dated Jun. 7, 2021, 11 pages.

(Continued)

*Primary Examiner* — Jean B Corrielus
(74) *Attorney, Agent, or Firm* — Womble Bond Dickinson (US) LLP

(57) ABSTRACT

Modular antennas with high instantaneous bandwidth are described. In one embodiment, an antenna comprises a plurality of antenna modules tiled together and configured to form one metasurface antenna with an array of surface scattering metamaterial antenna elements; and a feed network comprising a plurality of feed points coupled to the plurality of antenna modules to supply the modules with a feed wave.

19 Claims, 14 Drawing Sheets

(56) References Cited

U.S. PATENT DOCUMENTS

2019/0115658 A1* 4/2019 Iannotti ................ H04B 7/0667
2019/0237873 A1  8/2019 Sazegar et al.
2019/0356060 A1 11/2019 Daniel et al.

OTHER PUBLICATIONS

International Preliminary Report and Written Opinion on the Patentability of Application No. PCT/US2021/018039 dated Aug. 25, 2022, 8 pages.

* cited by examiner

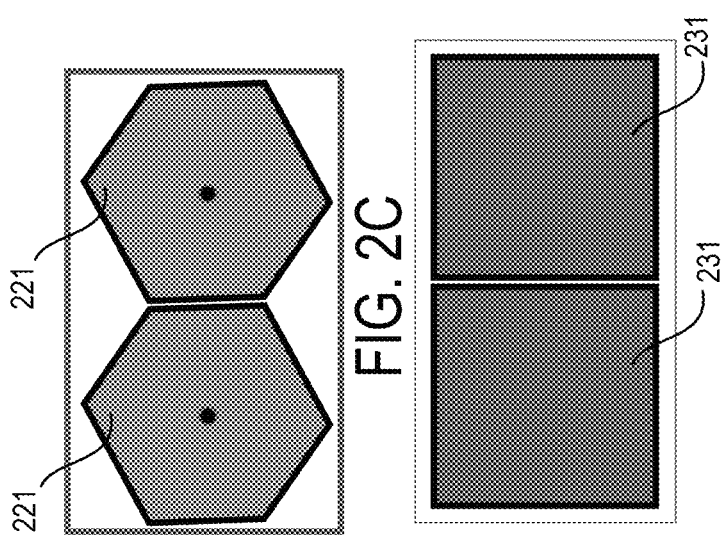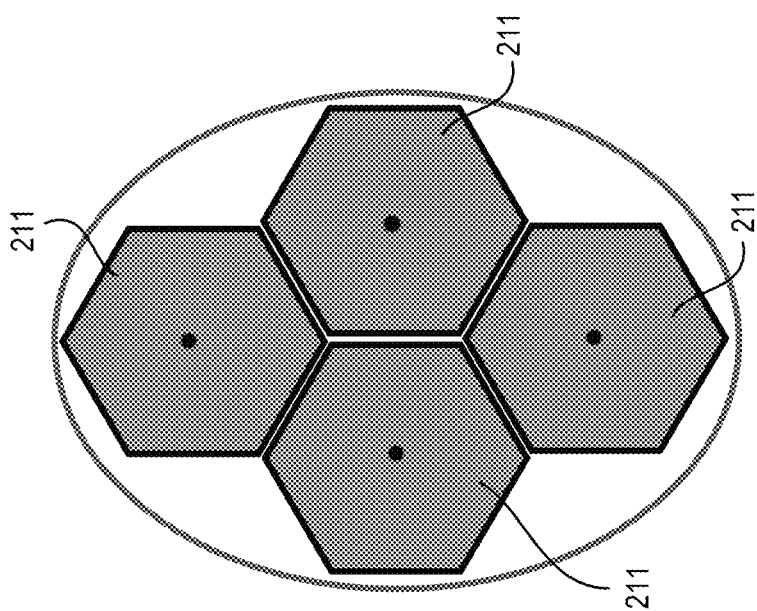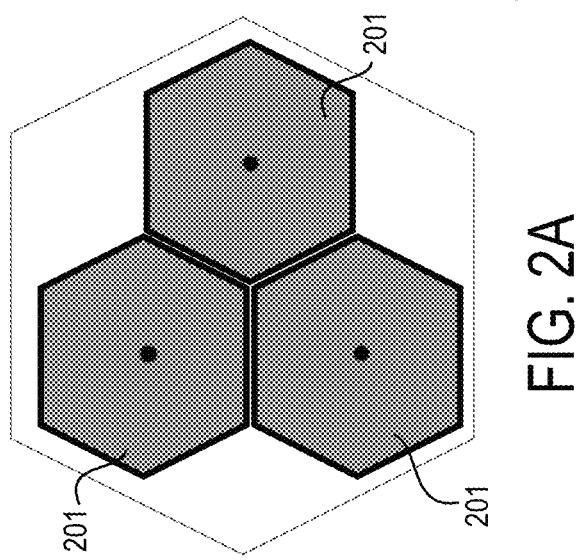

Iris L2

Iris L1

Patch and Iris L1

Top View

MODULAR METASURFACE ANTENNA WITH HIGH INSTANTANEOUS BANDWIDTH

This application claims benefit of priority from U.S. Provisional Application No. 62/977,006, titled "Modular Metasurface Antenna with High Instantaneous Bandwidth" and filed Feb. 14, 2020, which is hereby incorporated by reference.

BACKGROUND

Most emerging satellite networks such as Low Earth Orbit (LEO) Ku-band and LEO Ka-band will require a wide instantaneous bandwidth (IBW) that represents a challenge. Also one GEO requirement is that Ka-band networks require a minimum IBW of 500 MHz, while the requirements on antenna gain is high. To meet the gain requirements, the antenna size must become larger, which in turn reduces the IBW. Therefore, the IBW and gain stand in a tradeoff and it's difficult, if not impossible, to meet both requirements with a typical pure-analog flat panel antenna architecture.

SUMMARY

Modular antennas with high instantaneous bandwidth are described. In one embodiment, an antenna comprises a plurality of antenna modules tiled together and configured to form one metasurface antenna with an array of surface scattering metamaterial antenna elements; and a feed network comprising a plurality of feed points coupled to the plurality of antenna modules to supply the modules with a feed wave.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIGS. 2A-2D illustrate examples of antennas with different numbers and shapes of antenna modules.

DETAILED DESCRIPTION

Figure 1:
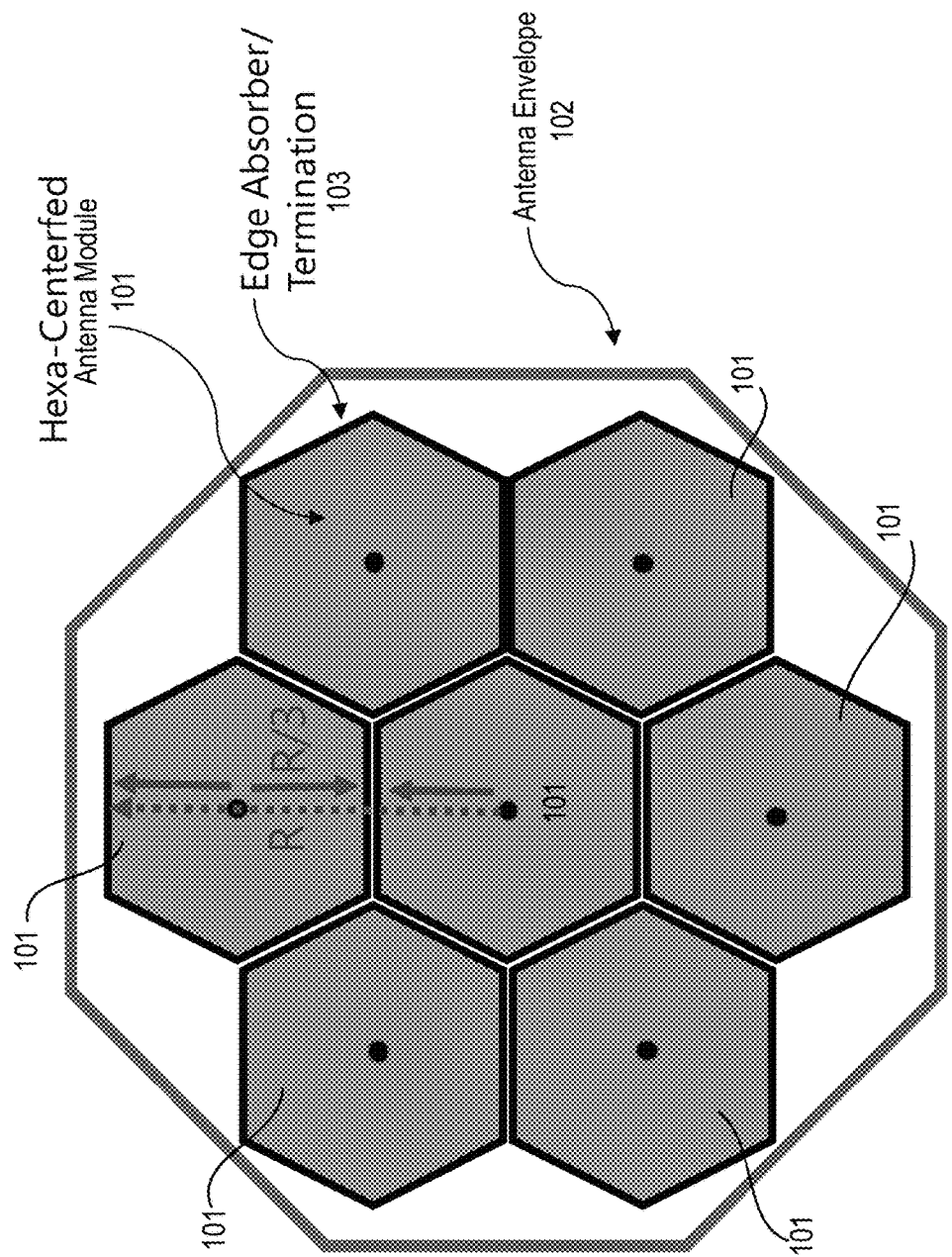
FIG. 1 illustrates one embodiment of an antenna having a modular structure.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Metasurface antennas with high instantaneous bandwidth (IBW) and techniques for building the same are disclosed. In one embodiment, the metasurface antennas comprise holographic metasurface antennas having multiple antenna modules with radio-frequency (RF) radiating antenna elements (e.g., surface scattering metamaterial antenna elements), such as, for example, described in more detail below. Note that at times, the antenna modules may be referred to herein as tiles.

In one embodiment, a metasurface antenna is built using a modular architecture that uses multiple feed points that each feed a traveling wave into its respective antenna module. In one embodiment, the antenna modules use a traveling wave guide structure as a feeding mechanism. There is a guide delay representing the delay associated with the travelling wave as it propagates through the guide structure, and the guide delay is determined by the path length of the travelling wave. The guide delay is one of the causes for beam squinting, which limits the IBW. By using multiple feed points, as opposed to a single feed point, the path length of the traveling wave is reduced since any long path length in the waveguide can be avoided. In this manner, the modular antenna architecture overcomes the challenge set forth above by breaking the dependency of IBW on antenna size, thereby improving the IBW of an antenna. Furthermore, the gain of the antenna can be increased by adding more antenna modules, while keeping the IBW constant. Thus, by combining multiple antenna modules, the antenna gain can be improved without compromising IBW. As a result, the squint can be significantly reduced and IBW becomes much wider.

The use of a modular architecture with multiple antenna modules also allows for rapid prototyping for different use cases. For example, the modular concept enables expediting the prototyping and fabrication since new antenna development is limited to designing a combiner network to combine the desired number of antenna modules. Furthermore, the modular architecture allows for the use of simpler fabrication processes as the size of an antenna module is much smaller the size of a single, large antenna. For instance, in one antenna embodiment, the thin-film transistor (TFT) substrate (e.g., glass, etc.) that includes TFTs to drive antenna elements can be fabricated in a smaller generation of liquid crystal display (LCD) manufacturing lines (where such lines are used with TFT fabrication on an antenna glass substrate), and fabrication tolerances of waveguide components with a smaller size is better and more easily controlled.

In one embodiment, an antenna with a modular architecture provides high IBW, which is required when using certain frequency bands. For example, Ka requires wide IBW (>500 MHz) at a high gain (e.g., G/T). Without the tiled approach described herein, a tradeoff between these two figures of merit, IBW and gain, is made for each particular antenna design.

In one embodiment, there are two contributors that limit the IBW: angle-of-arrival delay and guide delay. The modular approach/tiling approach described herein allows to mitigate both delay sources, which results in a wider IBW. That is, antenna embodiments described herein include a leaky wave antenna or metasurface antenna that is tiled to increase IBW.

To compensate for the angle-of-arrival delay, in one embodiment, a true-time-delay component is implemented behind every antenna module to compensate for the time difference. In one embodiment, to compensate for guide delay, antenna modules with a smaller tile size are used so that the time delay between the elements at the center of the antenna module and the elements on the edge of the antenna module is smaller, compared to a large antenna with only one aperture covering the same area as all the antenna modules for another antenna.

In one embodiment, an antenna comprises a plurality of antenna modules tiled together and configured to form one metasurface antenna with an array of surface scattering metamaterial antenna elements and a feed network comprising a plurality of feed points coupled to the plurality of antenna modules to supply the modules with a feed wave.

FIG. 1 illustrates one embodiment of an antenna having a modular structure. Referring to FIG. 1, an antenna envelope 102 contains seven antenna modules, or tiles, 101. The techniques described herein are not limited to having seven antenna modules and may have more or less than 7 antenna modules to tile antenna envelope 102. In one embodiment, each of the antenna modules 101 has a central feed point and is center-fed, such as, for example, the antenna apertures described in more detail below.

In one embodiment, antenna modules 101 are hexagonal-shaped, center-fed modules. This shape helps the total radiative area of the antenna to be efficiently packed, and unused/non-radiative areas are avoided. In one embodiment, the edges of each center-fed antenna module have an absorber material, such as shown as edge absorber/termination 103 to keep the neighboring antenna modules isolated from each other. While edge absorber/termination 103 appears along the side of the antenna module in FIG. 1, edge absorber/termination 103 is actually sitting under each antenna module at the edges for terminating the waveguide.

In FIG. 1, the path length from any feed point to the most far antenna element (e.g., RF radiating antenna element, etc.) is about one third of the path length in a single module antenna having the same sized area (e.g., covering antenna envelope 102) as the antenna modules above combined and having a single center feed. That is, the use of the modular approach results in the guide length being divided into three sub-paths. The shorter path length associated with the modular antenna design increases the IBW of the antenna. For example, in the case of Ka, when using an implementation that combines a reduced path length in the waveguide and the use of true-time-delay (TTD) compensation (as described in more detail below), IBW in a 75 cm antenna will increase for 1.3 GHz (3 dB peak-to-peak) and for 700 MHz (1 dB peak-to-peak).

Figure 5B:
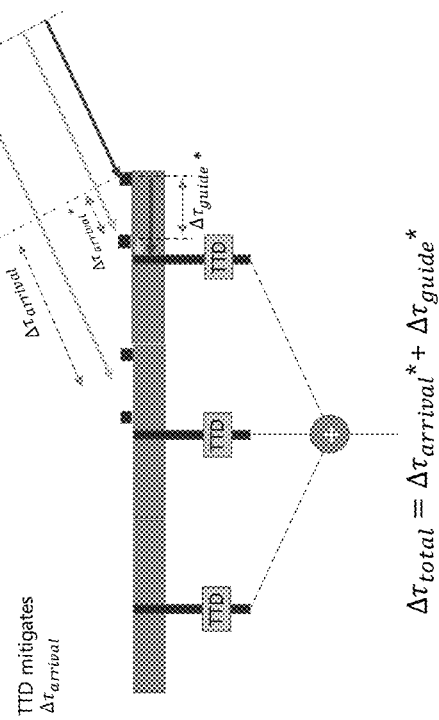
FIG. 5B is a side view of an antenna illustrating a tiled aperture with true-time delay (TTD) components.
Figure 5A:
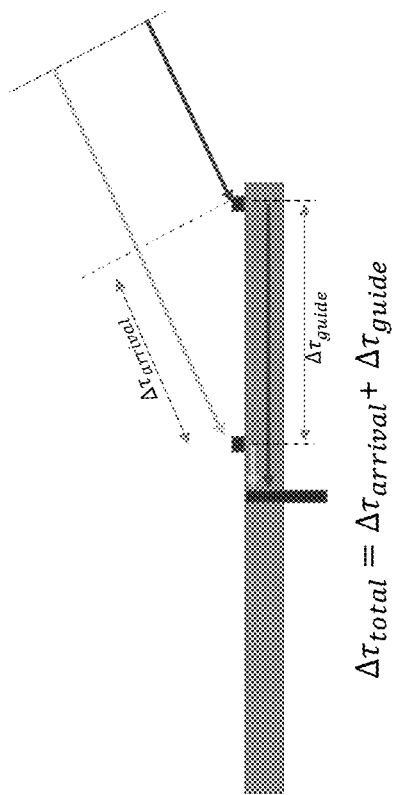
FIG. 5A is a side view of an antenna aperture illustrating a time of arrival associated with a single aperture.

In one embodiment, the antenna compensates for the angle-of-arrival time delay using true-time-delay (TTD) components, and the waveguide delay is smaller compared to a single antenna that has the same overall size of the tiled array. In other words, the antenna processes signals to compensate for the time delay that is the result of the angle of arrival. That leads to a smaller beam squint and thus to a larger IBW. FIG. 5A illustrates the time of arrival associated with a single aperture. FIG. 5B illustrates a side view of a tiled aperture with TTD. Referring to FIG. 5B, three antenna modules are shown and each has a TDD component underneath the antenna module that compensates for the delay associated with different angles of arrival for RF radiating antenna elements on different antenna modules as well as the guide delay.

A true-time-delay component can be implemented behind every module to compensate for the time difference. In one embodiment, the TTD components on the back of each antenna module delays the signals from the antenna module to compensate for the delay of arrival. In one embodiment, the compensation is implemented by performing the adjustments in software. In such a case, the software calculates the time delay that should be applied to each component. In one embodiment, the adjustments are applied at baseband. In such case, the signal received from each antenna module is downconverted and digitized and the time delay is then applied in the baseband. Thereafter, all the received signals are combined in baseband. In one embodiment, the same time delay compensation is applied, in reverse, for signals for transmit.

In an alternative embodiment, a TTD can also be implemented at RF or intermediate frequency (IF) frequency. In other words, the adjustments are applied at RF or at IF. In the case of RF, the adjustments are applied before the signals are downconverted. In the case of IF, the adjustments are applied after the signals are converted to IF prior to conversion to baseband.

Antenna modules of various numbers and shapes can be used in different configurations to satisfy different requirements and form factors and to achieve desired tradeoffs between IBW and antenna gain. Different applications have different form factors and when the aperture size can match the form factor, this increases the antenna performance by increasing the directivity.

FIGS. 2A-2D illustrate examples of antennas with different numbers and shapes of antenna modules. FIG. 2A illustrates an antenna having three hexagonally-shaped, center-fed antenna modules 201. FIG. 2B illustrates an antenna having four hexagonally-shaped, center-fed antenna modules 211. FIG. 2C illustrates an antenna having two hexagonally-shaped, center-fed antenna modules 221. FIG. 2D illustrates an antenna having two square-shaped antenna modules 231.

Also, the antenna modules do not all have to be the same shape. There could be some antenna modules that differ in shape throughout the antenna envelope, such as, for example, antenna envelope 102 of FIG. 1. For example, while FIG. 1 illustrates hexagonally-shaped antenna elements, an antenna element could be in the shape of a diamond or triangle, or additional antenna modules can be added with these other shapes to fill out an antenna envelope (e.g., more fully fill the antenna envelope). For example, smaller modules (tiles) may be shaped and be added at the edges of antenna modules 101 to maximize area usage and cover antenna envelope 102 of FIG. 1. In one embodiment, the antenna modules are shaped to fill the entire antenna envelope.

In one embodiment, in a center-fed antenna module, a coupler feeds the aperture from the center outward toward the edge of the aperture, while maintaining a uniform aperture illumination. In one embodiment, a metasurface antenna with a non-cylindrical shape and comprising a plurality of antenna modules, such as shown, for example, in FIG. 1, uses such a directional coupler.

Figure 3B:
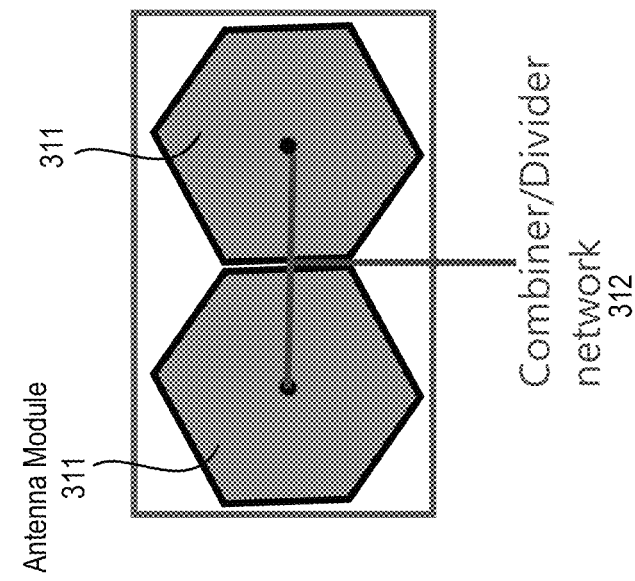
FIGS. 3A and 3B illustrate examples of radio-frequency (RF) combiner/divider networks.
Figure 3A:
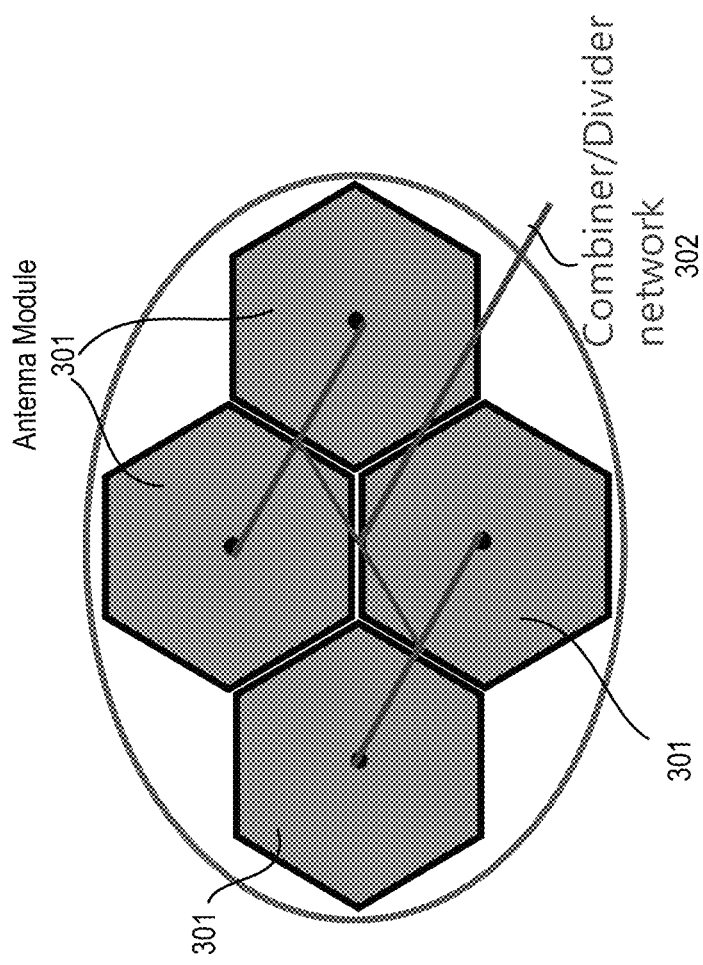

To operate multiple antenna modules as a single antenna, a power divider/combiner network is used to combine the receiving signals and divide the transmitted power. That is, the power divider/combiner network is used to divide and combine the transmit and receive signals, respectively. FIGS. 3A and 3B illustrate examples of RF combiner/divider networks. Referring to FIG. 3A, an antenna having four hexagonally-shaped, center-fed antenna modules 301 includes an RF combiner/divider 302. Referring to FIG. 3B, an antenna having two hexagonally-shaped, center-fed antenna modules 311 includes an RF combiner/divider 312.

In one embodiment, the power divider/combiner network comprises an analog RF divider/combiner network. In an alternative embodiment, the power divider/combiner network comprises a digital divider/combiner. With an analog RF divider/combiner network, an RF feed network combines and divides the signals into the channels and feeds the modules. Such an analog RF divider/combiner network may be customized. For example, customization may involve, for example, but not limited to, the number of modules, the size of the modules and how far the ports are from each other, and the location of each feed port. All of these can impact the feed network design.

In one embodiment, with a digital divider/combiner, each antenna module is equipped with an RF chain (e.g., a diplexer, an LNB, and a BUC) and the input/output connection is in IF-band. The IF band signals are then combined in a digital combiner. The use of the digital combiner allows for multi-beam operation as described in more detail below.

Note that the above modular architecture is different than having multiple separate antennas and combining their outputs to obtain an increase in gain. In one embodiment, all of the modules are part of the same substrate (e.g., a glass substrate) and the focus is on the RF combiner network to provide an increase in the IBW.

In on embodiment, one or more of the antenna modules includes mixed networks. Modules may be combined with mixed feed networks for more flexibility between performance and terminal cost on receive (Rx) versus transmit (Tx). For example, in one embodiment, the antenna modules of an antenna includes a digital implementation (e.g., a digital combiner) because the receive operation requires a higher IBW, while the transmit operation uses an analog network because it benefits from tighter pattern control. In such a case, the analog network can provide a cost-effective way to maintain coherence across all panels.

Figure 3C:
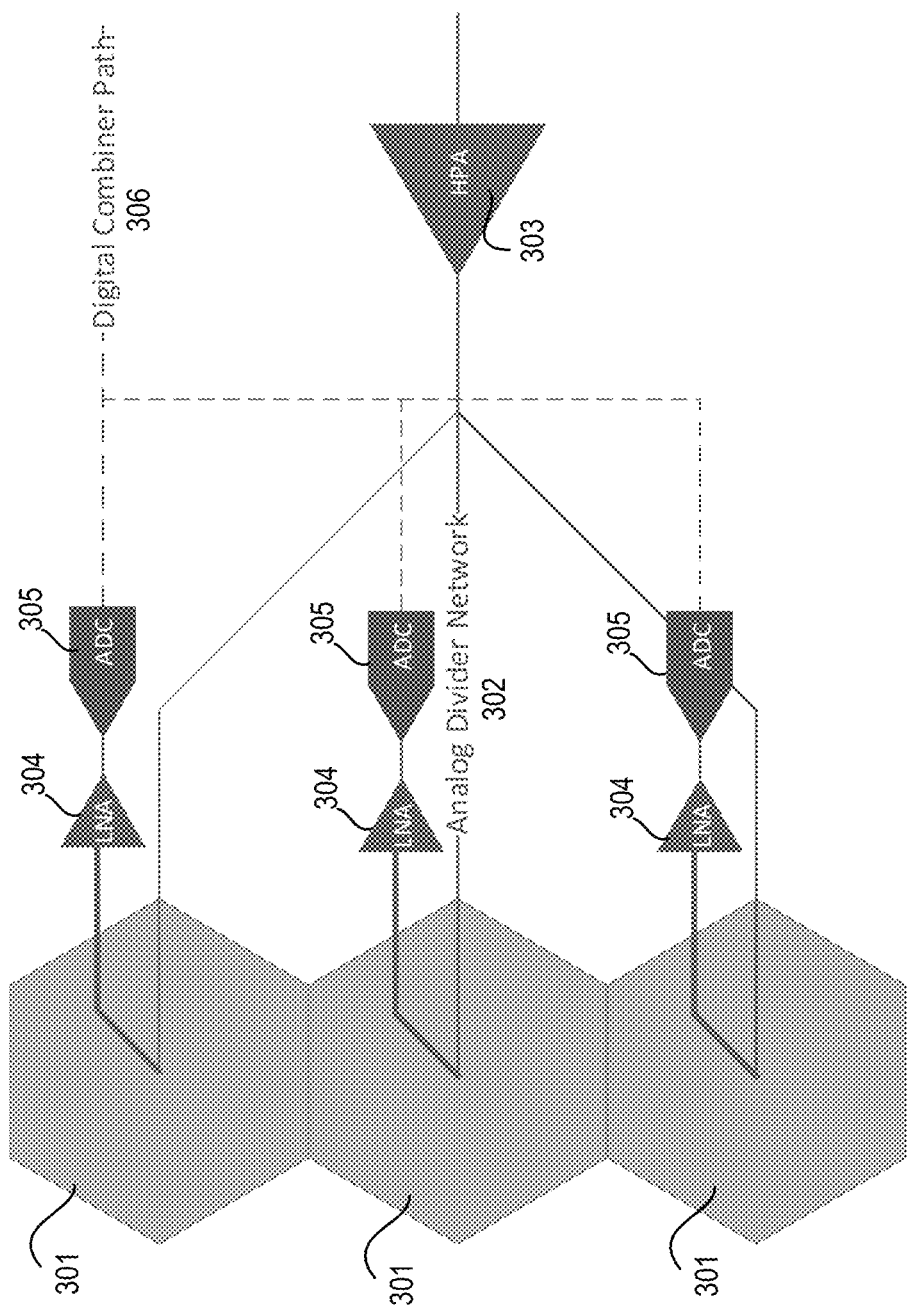
FIG. 3C illustrates an example of a mixed analog-divider/digital-combiner network

FIG. 3C illustrates an example of antenna modules using mixed networks. Referring to FIG. 3C, the antenna includes three antenna modules 301, though this is not a limit. Antenna modules 301 are driven for transmit using an analog divider network 302 coupled to and driven by a high-power amplifier (HPA) 303. On the receive side, there is a digital combiner path 306 that is fed from a low noise amplifier 304 and an analog-to-digital converter (ADC) 305 associated with each antenna module 301.

The mixed analog/digital networks described above complement a hybrid tile-and-array beamforming approach with the metasurface antenna modules (tiles). On the receive side, each tile's control pattern that is for controlling each of the metamaterial antenna elements of the antenna module is independent from the others, such that it creates a complete antenna pattern as a tile. On the transmit side, each tile is participating in the beamforming at the array level. That is, while each antenna module may receive a control pattern that is generated by a controller, the control pattern is part of a pattern generated across multiple antenna modules (e.g., all the antenna modules of the antenna). By doing so, this enables greater control over sidelobes and grating lobes during transmit.

Figure 4B:
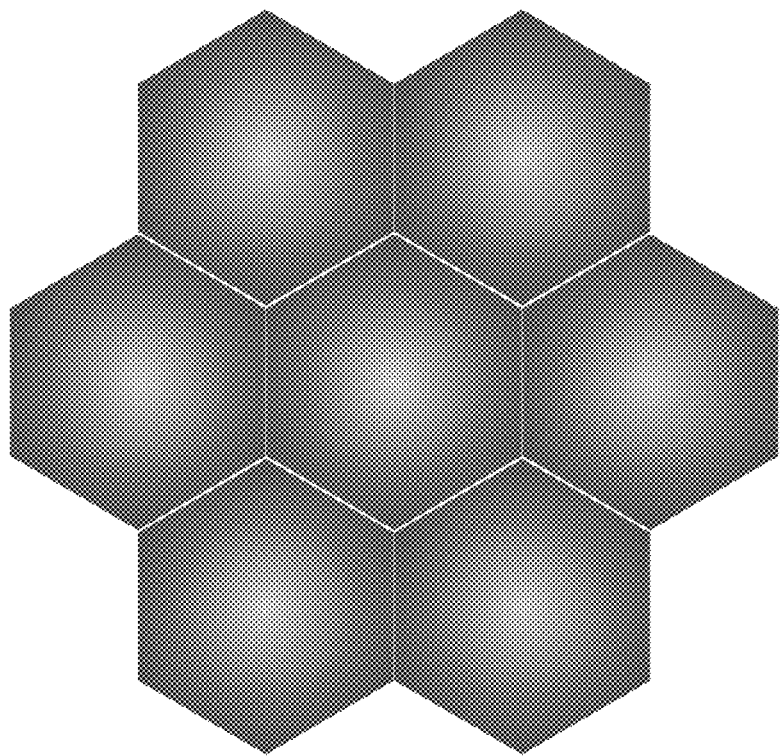
FIG. 4B illustrates a receive pattern per antenna module.
Figure 4A:
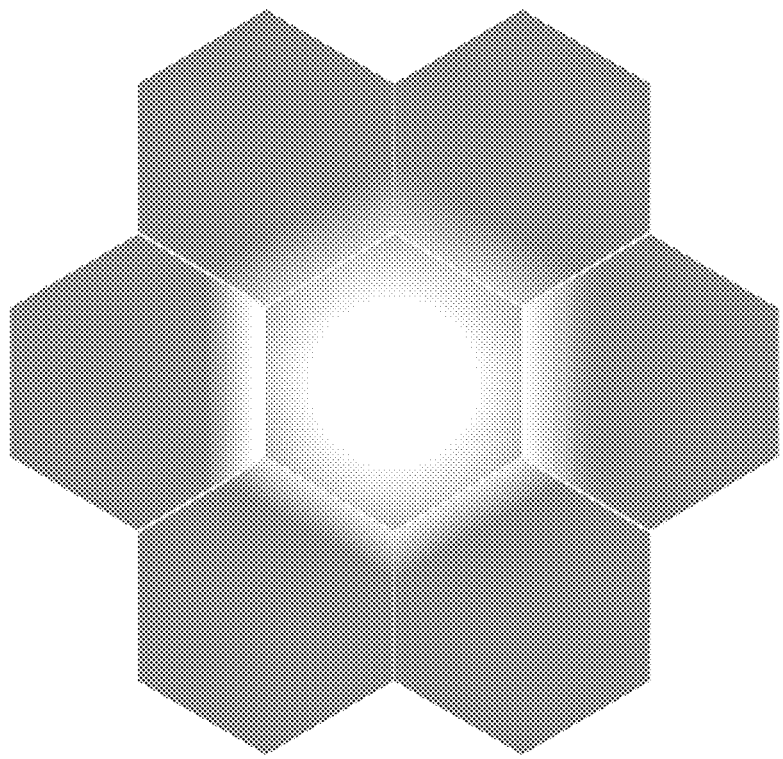
FIG. 4A illustrates a transmit pattern across the array of surface scattering metamaterial transmit antenna elements.

FIG. 4A illustrates a transmit pattern across the array of surface scattering metamaterial transmit antenna elements, while FIG. 4B illustrates an example where there is a receive pattern per antenna module (and its plurality of surface scattering metamaterial receive antenna elements). Thus, each antenna module includes receive and transmit antenna elements (e.g., RF radiating antenna elements). Examples of such an array are disclosed, for example, in U.S. patent application Ser. No. 16/247,398, titled "Broad Tunable Bandwidth Radial Line Slot Antenna," filed Jan. 14, 2019 and U.S. Pat. No. 9,893,435, titled "Combined antenna apertures allowing simultaneous multiple antenna functionality," issued on Feb. 13, 2018. During transmit in FIG. 4A, all the tiles operate as a single metasurface antenna with a pattern distributed across the tiles so that it forms a pattern as the array, while during receive in FIG. 4B, the tiles operate independently so each tile is performing beam forming during receive.

In the example shown in FIGS. 4A and 4B, a controller is coupled to the antenna modules to generate control patterns for the antenna modules. The controller generates the control pattern for the receive antenna elements (e.g., a plurality of surface scattering metamaterial receive antenna elements) for each antenna module that is independent from other antenna modules in the antenna to enable each antenna module to perform beam forming. The controller also generates a control pattern across all or a portion of antenna modules of the antenna for the transmit antenna elements (e.g., surface scattering metamaterial transmit antenna elements) on individual antenna modules to enable the antenna modules to participate in beamforming at an array level. This allows to apply an amplitude tapering on the larger array, which allows to reduce sidelobes for the transmit beam.

Note that in one embodiment, all the antenna modules participate in both receive and transmit operations. However, in alternative embodiments, less than all of the antenna modules participate in receive and transmit operations. Furthermore, in one alternative embodiment, the number of antenna modules participating in receive is different than the number of antenna modules participating in transmit. Thus, different sets of antenna modules may be participating in transmit and receive.

In one embodiment, a waveguide is below each antenna module to provide a feeding wave to antenna elements of the antenna module. Examples of such waveguides and antenna elements are given below. Note that many waveguide types may be used to build the feed. However, to obtain low losses, the use of hollow waveguide feeds is preferred.

EXAMPLES OF ANTENNA EMBODIMENTS

The techniques described above may be used with flat panel antennas. Embodiments of such flat panel antennas are disclosed. The flat panel antennas include one or more arrays of antenna elements on an antenna aperture. In one embodiment, the antenna elements comprise liquid crystal cells. In one embodiment, the flat panel antenna is a cylindrically fed antenna that includes matrix drive circuitry to uniquely address and drive each of the antenna elements that are not placed in rows and columns. In one embodiment, the elements are placed in rings.

In one embodiment, the antenna aperture having the one or more arrays of antenna elements is comprised of multiple segments coupled together. When coupled together, the combination of the segments form closed concentric rings of antenna elements. In one embodiment, the concentric rings are concentric with respect to the antenna feed.

Examples of Antenna Systems

In one embodiment, the flat panel antenna is part of a metamaterial antenna system. Embodiments of a metamaterial antenna system for communications satellite earth stations are described. In one embodiment, the antenna system is a component or subsystem of a satellite earth station (ES) operating on a mobile platform (e.g., aeronautical, maritime, land, etc.) that operates using either Ka-band frequencies or Ku-band frequencies for civil commercial satellite communications. Note that embodiments of the antenna system also can be used in earth stations that are not on mobile platforms (e.g., fixed or transportable earth stations).

In one embodiment, the antenna system uses surface scattering metamaterial technology to form and steer transmit and receive beams through separate antennas.

In one embodiment, the antenna system is comprised of three functional subsystems: (1) a wave guiding structure consisting of a cylindrical wave feed architecture; (2) an array of wave scattering metamaterial unit cells that are part of antenna elements; and (3) a control structure to command formation of an adjustable radiation field (beam) from the metamaterial scattering elements using holographic principles.

Antenna Elements

Figure 6:
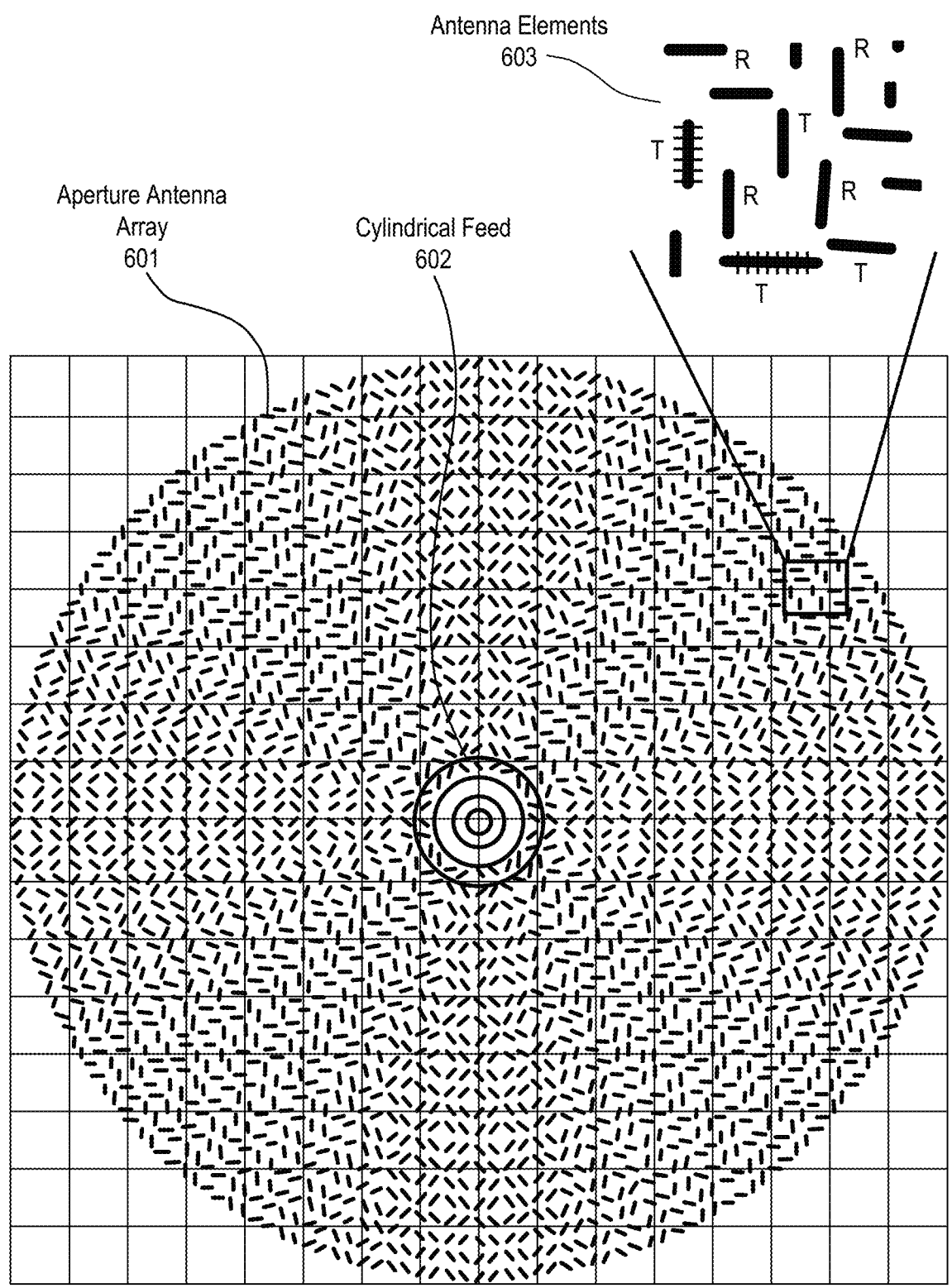
FIG. 6 illustrates an aperture having one or more arrays of antenna elements placed in concentric rings around an input feed of the cylindrically fed antenna.

FIG. 6 illustrates the schematic of one embodiment of a cylindrically fed holographic radial aperture antenna. Referring to FIG. 6, the antenna aperture has one or more arrays 601 of antenna elements 603 that are placed in concentric rings around an input feed 602 of the cylindrically fed antenna. In one embodiment, antenna elements 603 are radio frequency (RF) resonators that radiate RF energy. In one embodiment, antenna elements 603 comprise both Rx and Tx irises that are interleaved and distributed on the whole surface of the antenna aperture. Examples of such antenna elements are described in greater detail below. Note that the RF resonators described herein may be used in antennas that do not include a cylindrical feed.

In one embodiment, the antenna includes a coaxial feed that is used to provide a cylindrical wave feed via input feed 602. In one embodiment, the cylindrical wave feed architecture feeds the antenna from a central point with an excitation that spreads outward in a cylindrical manner from the feed point. That is, a cylindrically fed antenna creates an outward travelling concentric feed wave. Even so, the shape of the cylindrical feed antenna around the cylindrical feed can be circular, square or any shape. In another embodiment, a cylindrically fed antenna creates an inward travelling feed wave. In such a case, the feed wave most naturally comes from a circular structure.

In one embodiment, antenna elements 603 comprise irises and the aperture antenna of FIG. 6 is used to generate a main beam shaped by using excitation from a cylindrical feed wave for radiating irises through tunable liquid crystal (LC) material. In one embodiment, the antenna can be excited to radiate a horizontally or vertically polarized electric field at desired scan angles.

In one embodiment, the antenna elements comprise a group of patch antennas. This group of patch antennas comprises an array of scattering metamaterial elements. In one embodiment, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor. As would be understood by those skilled in the art, LC in the context of CELC refers to inductance-capacitance, as opposed to liquid crystal.

In one embodiment, a liquid crystal (LC) is disposed in the gap around the scattering element. This LC is driven by the direct drive embodiments described above. In one embodiment, liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, in one embodiment, the liquid crystal integrates an on/off switch for the transmission of energy from the guided wave to the CELC. When switched on, the CELC emits an electromagnetic wave like an electrically small dipole antenna. Note that the teachings herein are not limited to having a liquid crystal that operates in a binary fashion with respect to energy transmission.

In one embodiment, the feed geometry of this antenna system allows the antenna elements to be positioned at forty-five-degree (45°) angles to the vector of the wave in the wave feed. Note that other positions may be used (e.g., at 40° angles). This position of the elements enables control of the free space wave received by or transmitted/radiated from the elements. In one embodiment, the antenna elements are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the two sets of elements are perpendicular to each other and simultaneously have equal amplitude excitation if controlled to the same tuning state. Rotating them +/−45 degrees relative to the feed wave excitation achieves both desired features at once. Rotating one set 0 degrees and the other 90 degrees would achieve the perpendicular goal, but not the equal amplitude excitation goal. Note that 0 and 90 degrees may be used to achieve isolation when feeding the array of antenna elements in a single structure from two sides.

The amount of radiated power from each unit cell is controlled by applying a voltage to the patch (potential across the LC channel) using a controller. Traces to each patch are used to provide the voltage to the patch antenna. The voltage is used to tune or detune the capacitance and thus the resonance frequency of individual elements to effectuate beam forming. The voltage required is dependent on the liquid crystal mixture being used. The voltage tuning characteristic of liquid crystal mixtures is mainly described by a threshold voltage at which the liquid crystal starts to be affected by the voltage and the saturation voltage, above which an increase of the voltage does not cause major tuning in liquid crystal. These two characteristic parameters can change for different liquid crystal mixtures.

In one embodiment, as discussed above, a matrix drive is used to apply voltage to the patches in order to drive each cell separately from all the other cells without having a separate connection for each cell (direct drive). Because of the high density of elements, the matrix drive is an efficient way to address each cell individually.

In one embodiment, the control structure for the antenna system has 2 main components: the antenna array controller, which includes drive electronics, for the antenna system, is below the wave scattering structure, while the matrix drive switching array is interspersed throughout the radiating RF array in such a way as to not interfere with the radiation. In one embodiment, the drive electronics for the antenna system comprise commercial off-the shelf LCD controls used in commercial television appliances that adjust the bias voltage for each scattering element by adjusting the amplitude or duty cycle of an AC bias signal to that element.

In one embodiment, the antenna array controller also contains a microprocessor executing the software. The control structure may also incorporate sensors (e.g., a GPS receiver, a three-axis compass, a 3-axis accelerometer, 3-axis gyro, 3-axis magnetometer, etc.) to provide location and orientation information to the processor. The location and orientation information may be provided to the processor by other systems in the earth station and/or may not be part of the antenna system.

More specifically, the antenna array controller controls which elements are turned off and those elements turned on and at which phase and amplitude level at the frequency of operation. The elements are selectively detuned for frequency operation by voltage application.

For transmission, a controller supplies an array of voltage signals to the RF patches to create a modulation, or control pattern. The control pattern causes the elements to be turned to different states. In one embodiment, multistate control is used in which various elements are turned on and off to varying levels, further approximating a sinusoidal control pattern, as opposed to a square wave (i.e., a sinusoid gray shade modulation pattern). In one embodiment, some elements radiate more strongly than others, rather than some elements radiate and some do not. Variable radiation is achieved by applying specific voltage levels, which adjusts the liquid crystal permittivity to varying amounts, thereby detuning elements variably and causing some elements to radiate more than others.

The generation of a focused beam by the metamaterial array of elements can be explained by the phenomenon of constructive and destructive interference. Individual electromagnetic waves sum up (constructive interference) if they have the same phase when they meet in free space and waves cancel each other (destructive interference) if they are in opposite phase when they meet in free space. If the slots in a slotted antenna are positioned so that each successive slot is positioned at a different distance from the excitation point of the guided wave, the scattered wave from that element will have a different phase than the scattered wave of the previous slot. If the slots are spaced one quarter of a guided wavelength apart, each slot will scatter a wave with a one fourth phase delay from the previous slot.

Using the array, the number of patterns of constructive and destructive interference that can be produced can be increased so that beams can be pointed theoretically in any direction plus or minus ninety degrees (90°) from the bore sight of the antenna array, using the principles of holography. Thus, by controlling which metamaterial unit cells are turned on or off (i.e., by changing the pattern of which cells are turned on and which cells are turned off), a different pattern of constructive and destructive interference can be produced, and the antenna can change the direction of the main beam. The time required to turn the unit cells on and off dictates the speed at which the beam can be switched from one location to another location.

In one embodiment, the antenna system produces one steerable beam for the uplink antenna and one steerable beam for the downlink antenna. In one embodiment, the antenna system uses metamaterial technology to receive beams and to decode signals from the satellite and to form transmit beams that are directed toward the satellite. In one embodiment, the antenna systems are analog systems, in contrast to antenna systems that employ digital signal processing to electrically form and steer beams (such as phased array antennas). In one embodiment, the antenna system is considered a "surface" antenna that is planar and relatively low profile, especially when compared to conventional satellite dish receivers.

Figure 7:
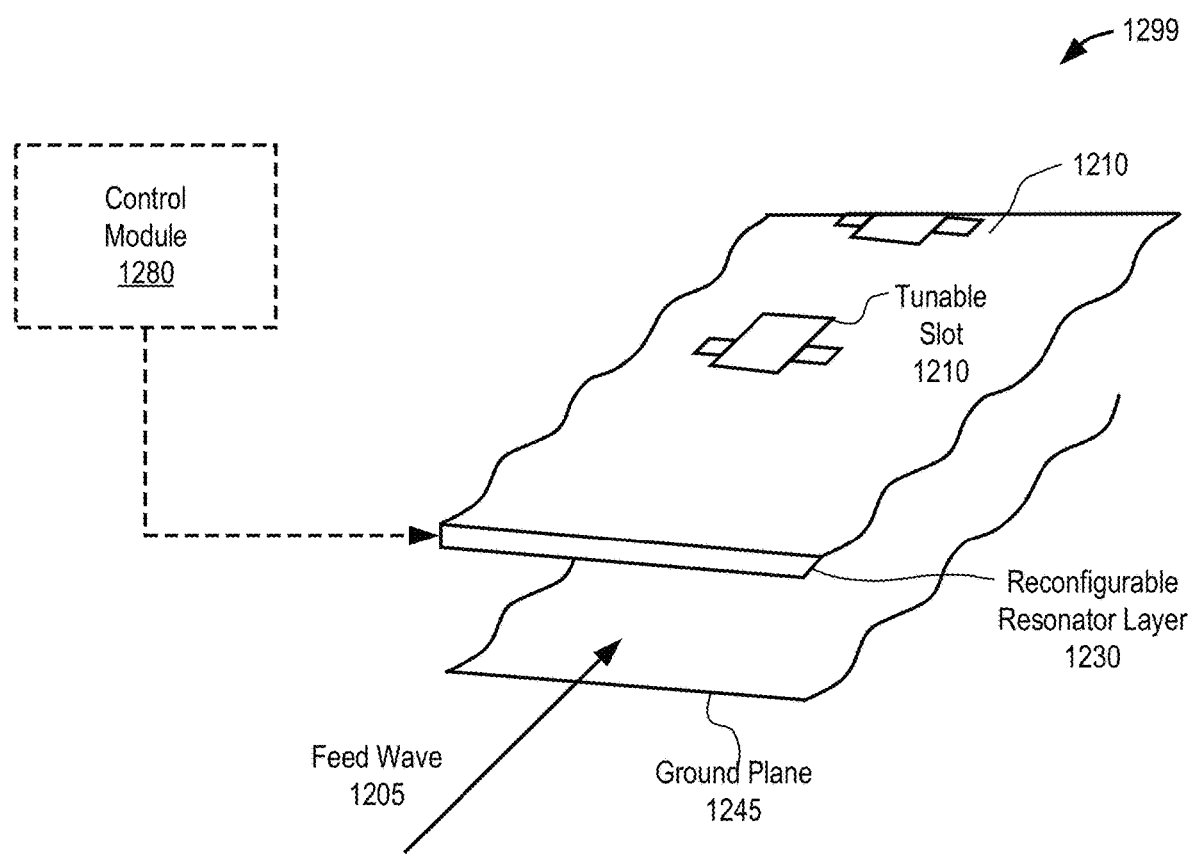
FIG. 7 illustrates a perspective view of one row of antenna elements that includes a ground plane and a reconfigurable resonator layer.

FIG. 7 illustrates a perspective view of one row of antenna elements that includes a ground plane and a reconfigurable resonator layer. Reconfigurable resonator layer 1230 includes an array of tunable slots 1210. The array of tunable slots 1210 can be configured to point the antenna in a desired direction. Each of the tunable slots can be tuned/adjusted by varying a voltage across the liquid crystal.

Figure 8A:
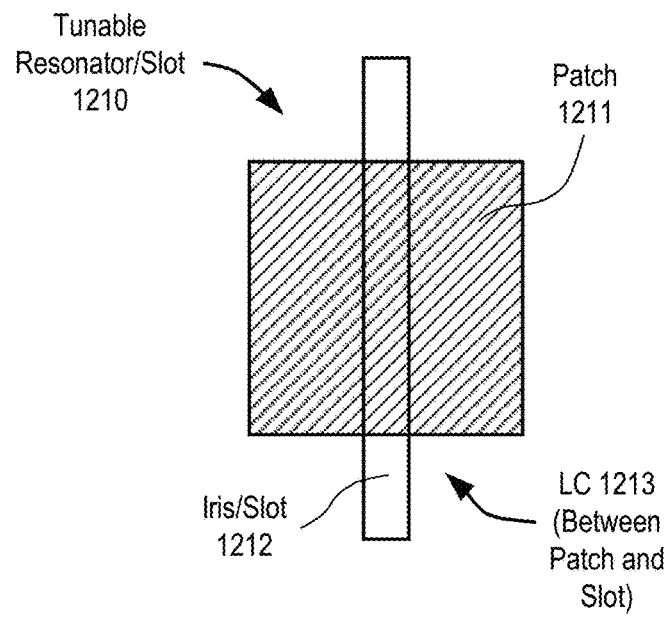
FIG. 8A illustrates one embodiment of a tunable resonator/slot 1210.

Control module 1280 is coupled to reconfigurable resonator layer 1230 to modulate the array of tunable slots 1210 by varying the voltage across the liquid crystal in FIG. 8A. Control module 1280 may include a Field Programmable Gate Array ("FPGA"), a microprocessor, a controller, System-on-a-Chip (SoC), or other processing logic. In one embodiment, control module 1280 includes logic circuitry (e.g., multiplexer) to drive the array of tunable slots 1210. In one embodiment, control module 1280 receives data that includes specifications for a holographic diffraction pattern to be driven onto the array of tunable slots 1210. The holographic diffraction patterns may be generated in response to a spatial relationship between the antenna and a satellite so that the holographic diffraction pattern steers the downlink beams (and uplink beam if the antenna system performs transmit) in the appropriate direction for communication. Although not drawn in each figure, a control module similar to control module 1280 may drive each array of tunable slots described in the figures of the disclosure.

Radio Frequency ("RF") holography is also possible using analogous techniques where a desired RF beam can be generated when an RF reference beam encounters an RF holographic diffraction pattern. In the case of satellite communications, the reference beam is in the form of a feed wave, such as feed wave 1205 (approximately 20 GHz in some embodiments). To transform a feed wave into a radiated beam (either for transmitting or receiving purposes), an interference pattern is calculated between the desired RF beam (the object beam) and the feed wave (the reference beam). The interference pattern is driven onto the array of tunable slots 1210 as a diffraction pattern so that the feed wave is "steered" into the desired RF beam (having the desired shape and direction). In other words, the feed wave encountering the holographic diffraction pattern "reconstructs" the object beam, which is formed according to design requirements of the communication system. The holographic diffraction pattern contains the excitation of each element and is calculated by $w_{hologram}=w_{in}*w_{out}$, with $w_{in}$ as the wave equation in the waveguide and $w_{out}$ the wave equation on the outgoing wave.

FIG. 8A illustrates one embodiment of a tunable resonator/slot 1210. Tunable slot 1210 includes an iris/slot 1212, a radiating patch 1211, and liquid crystal 1213 disposed between iris 1212 and patch 1211. In one embodiment, radiating patch 1211 is co-located with iris 1212.

Figure 8B:
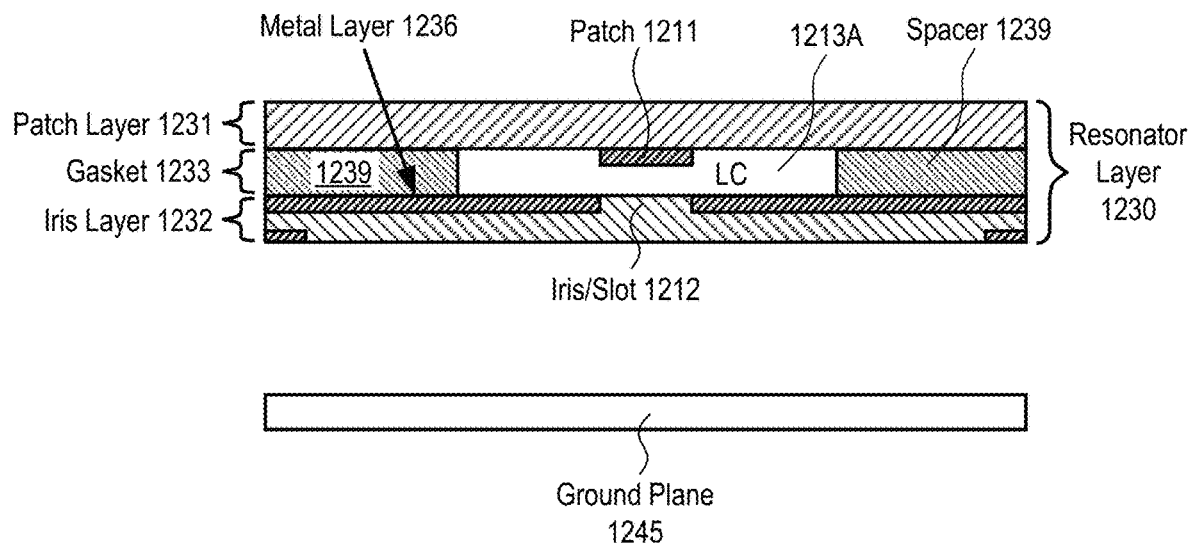
FIG. 8B illustrates a cross section view of one embodiment of a physical antenna aperture.

FIG. 8B illustrates a cross section view of one embodiment of a physical antenna aperture. The antenna aperture includes ground plane 1245, and a metal layer 1236 within iris layer 1233, which is included in reconfigurable resonator layer 1230. In one embodiment, the antenna aperture of FIG. 8B includes a plurality of tunable resonator/slots 1210 of FIG. 8A. Iris/slot 1212 is defined by openings in metal layer 1236. A feed wave, such as feed wave 1205 of FIG. 8A, may have a microwave frequency compatible with satellite communication channels. The feed wave propagates between ground plane 1245 and resonator layer 1230.

Reconfigurable resonator layer 1230 also includes gasket layer 1233 and patch layer 1231. Gasket layer 1233 is disposed between patch layer 1231 and iris layer 1232. Note that in one embodiment, a spacer could replace gasket layer 1233. In one embodiment, iris layer 1232 is a printed circuit board ("PCB") that includes a copper layer as metal layer 1236. In one embodiment, iris layer 1232 is glass. Iris layer 1232 may be other types of substrates.

Openings may be etched in the copper layer to form slots 1212. In one embodiment, iris layer 1232 is conductively coupled by a conductive bonding layer to another structure (e.g., a waveguide) in FIG. 8B. Note that in an embodiment the iris layer is not conductively coupled by a conductive bonding layer and is instead interfaced with a non-conducting bonding layer.

Patch layer 1231 may also be a PCB that includes metal as radiating patches 1211. In one embodiment, gasket layer 1233 includes spacers 1239 that provide a mechanical standoff to define the dimension between metal layer 1236 and patch 1211. In one embodiment, the spacers are 75 microns, but other sizes may be used (e.g., 3-200 mm). As mentioned above, in one embodiment, the antenna aperture of FIG. 8B includes multiple tunable resonator/slots, such as tunable resonator/slot 1210 includes patch 1211, liquid crystal 1213, and iris 1212 of FIG. 8A. The chamber for liquid crystal 1213A is defined by spacers 1239, iris layer 1232 and metal layer 1236. When the chamber is filled with liquid crystal, patch layer 1231 can be laminated onto spacers 1239 to seal liquid crystal within resonator layer 1230.

A voltage between patch layer 1231 and iris layer 1232 can be modulated to tune the liquid crystal in the gap between the patch and the slots (e.g., tunable resonator/slot 1210). Adjusting the voltage across liquid crystal 1213 varies the capacitance of a slot (e.g., tunable resonator/slot 1210). Accordingly, the reactance of a slot (e.g., tunable resonator/slot 1210) can be varied by changing the capacitance. Resonant frequency of slot 1210 also changes according to the equation $f=1/2\pi\sqrt{LC}$ where f is the resonant frequency of slot 1210 and L and C are the inductance and capacitance of slot 1210, respectively. The resonant frequency of slot 1210 affects the energy radiated from feed wave 1205 propagating through the waveguide. As an example, if feed wave 1205 is 20 GHz, the resonant frequency of a slot 1210 may be adjusted (by varying the capacitance) to 17 GHz so that the slot 1210 couples substantially no energy from feed wave 1205. Or, the resonant frequency of a slot 1210 may be adjusted to 20 GHz so that the slot 1210 couples energy from feed wave 1205 and radiates that energy into free space. Although the examples given are binary (fully radiating or not radiating at all), full gray scale control of the reactance, and therefore the resonant frequency of slot 1210 is possible with voltage variance over a multi-valued range. Hence, the energy radiated from each slot 1210 can be finely controlled so that detailed holographic diffraction patterns can be formed by the array of tunable slots.

In one embodiment, tunable slots in a row are spaced from each other by $\lambda/5$. Other spacings may be used. In one embodiment, each tunable slot in a row is spaced from the closest tunable slot in an adjacent row by $\lambda/2$, and, thus, commonly oriented tunable slots in different rows are spaced by $\lambda/4$, though other spacings are possible (e.g., $\lambda/5$, $\lambda/6.3$). In another embodiment, each tunable slot in a row is spaced from the closest tunable slot in an adjacent row by $\lambda/3$.

Embodiments use reconfigurable metamaterial technology, such as described in U.S. patent application Ser. No. 14/550,178, entitled "Dynamic Polarization and Coupling Control from a Steerable Cylindrically Fed Holographic Antenna", filed Nov. 21, 2014, now U.S. Pat. No. 9,887,456, and U.S. patent application Ser. No. 14/610,502, entitled "Ridged Waveguide Feed Structures for Reconfigurable Antenna", filed Jan. 30, 2015, now U.S. Pat. No. 10,256,548.

FIGS. 9A-D illustrate one embodiment of the different layers for creating the slotted array. The antenna array includes antenna elements that are positioned in rings, such as the example rings shown in FIG. 6. Note that in this example the antenna array has two different types of antenna elements that are used for two different types of frequency bands.

Figure 9A:
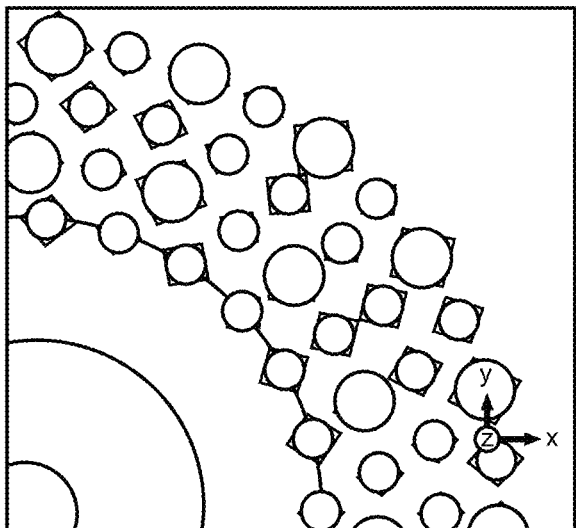
FIG. 9A illustrates a portion of the first iris board layer with locations corresponding to the slots.
Figure 9B:
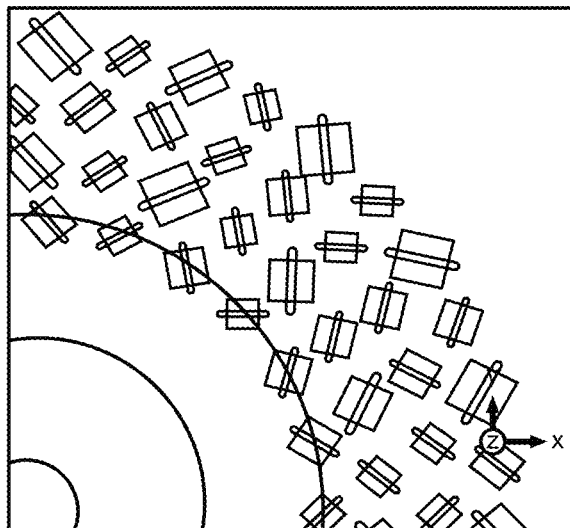
FIG. 9B illustrates a portion of the second iris board layer containing slots.
Figure 9C:
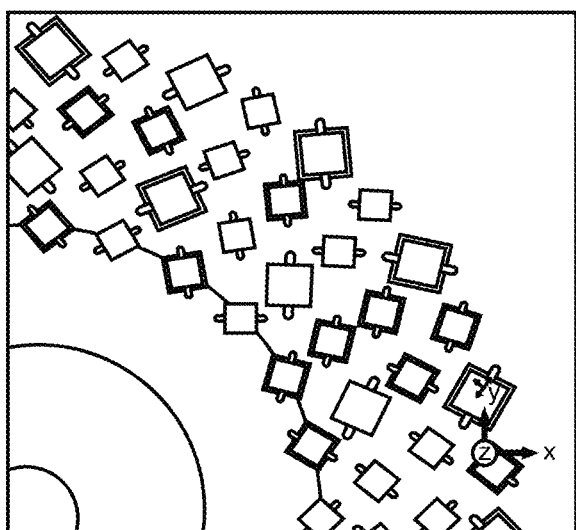
FIG. 9C illustrates patches over a portion of the second iris board layer.
Figure 9D:
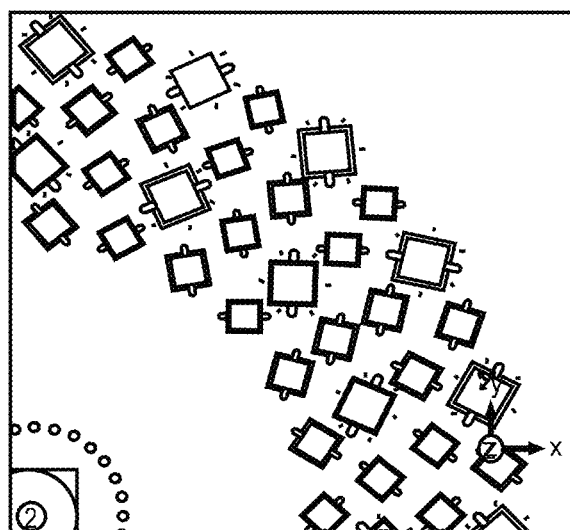
FIG. 9D illustrates a top view of a portion of the slotted array.

FIG. 9A illustrates a portion of the first iris board layer with locations corresponding to the slots. Referring to FIG. 9A, the circles are open areas/slots in the metallization in the bottom side of the iris substrate, and are for controlling the coupling of elements to the feed (the feed wave). Note that this layer is an optional layer and is not used in all designs. FIG. 9B illustrates a portion of the second iris board layer containing slots. FIG. 9C illustrates patches over a portion of the second iris board layer. FIG. 9D illustrates a top view of a portion of the slotted array.

Figure 10:
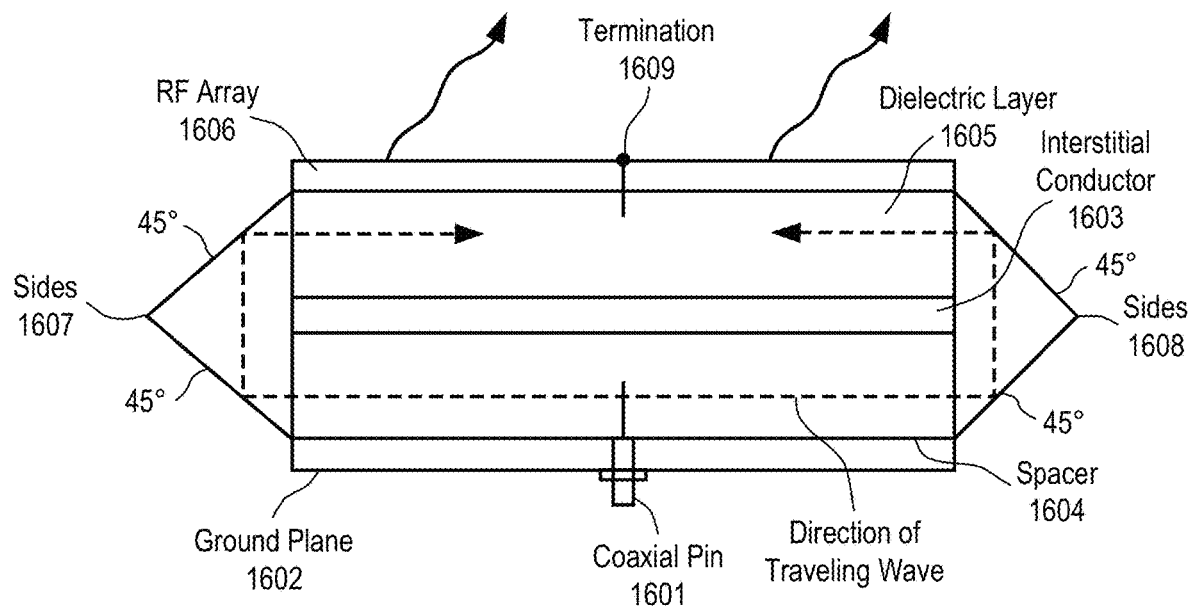
FIG. 10 illustrates a side view of one embodiment of a cylindrically fed antenna structure.

FIG. 10 illustrates a side view of one embodiment of a cylindrically fed antenna structure. The antenna produces an inwardly travelling wave using a double layer feed structure (i.e., two layers of a feed structure). In one embodiment, the antenna includes a circular outer shape, though this is not required. That is, non-circular inward travelling structures can be used. In one embodiment, the antenna structure in FIG. 10 includes a coaxial feed, such as, for example, described in U.S. Publication No. 2015/0236412, entitled "Dynamic Polarization and Coupling Control from a Steerable Cylindrically Fed Holographic Antenna", filed on Nov. 21, 2014.

Referring to FIG. 10, a coaxial pin 1601 is used to excite the field on the lower level of the antenna. In one embodiment, coaxial pin 1601 is a 50Ω coax pin that is readily available. Coaxial pin 1601 is coupled (e.g., bolted) to the bottom of the antenna structure, which is conducting ground plane 1602.

Separate from conducting ground plane 1602 is interstitial conductor 1603, which is an internal conductor. In one embodiment, conducting ground plane 1602 and interstitial conductor 1603 are parallel to each other. In one embodiment, the distance between ground plane 1602 and interstitial conductor 1603 is 0.1-0.15". In another embodiment, this distance may be $\lambda/2$, where $\lambda$ is the wavelength of the travelling wave at the frequency of operation.

Ground plane 1602 is separated from interstitial conductor 1603 via a spacer 1604. In one embodiment, spacer 1604 is a foam or air-like spacer. In one embodiment, spacer 1604 comprises a plastic spacer.

On top of interstitial conductor 1603 is dielectric layer 1605. In one embodiment, dielectric layer 1605 is plastic. The purpose of dielectric layer 1605 is to slow the travelling wave relative to free space velocity. In one embodiment, dielectric layer 1605 slows the travelling wave by 30% relative to free space. In one embodiment, the range of indices of refraction that are suitable for beam forming are 1.2-1.8, where free space has by definition an index of refraction equal to 1. Other dielectric spacer materials, such as, for example, plastic, may be used to achieve this effect. Note that materials other than plastic may be used as long as they achieve the desired wave slowing effect. Alternatively, a material with distributed structures may be used as dielectric 1605, such as periodic sub-wavelength metallic structures that can be machined or lithographically defined, for example.

An RF-array 1606 is on top of dielectric 1605. In one embodiment, the distance between interstitial conductor 1603 and RF-array 1606 is 0.1-0.15". In another embodiment, this distance may be $\lambda_{eff}/2$, where $\lambda_{eff}$ is the effective wavelength in the medium at the design frequency.

The antenna includes sides 1607 and 1608. Sides 1607 and 1608 are angled to cause a travelling wave feed from coax pin 1601 to be propagated from the area below interstitial conductor 1603 (the spacer layer) to the area above interstitial conductor 1603 (the dielectric layer) via reflection. In one embodiment, the angle of sides 1607 and 1608 are at 45° angles. In an alternative embodiment, sides 1607 and 1608 could be replaced with a continuous radius to achieve the reflection. While FIG. 10 shows angled sides that have angle of 45 degrees, other angles that accomplish signal transmission from lower-level feed to upper-level feed may be used. That is, given that the effective wavelength in the lower feed will generally be different than in the upper feed, some deviation from the ideal 45° angles could be used to aid transmission from the lower to the upper feed level. For example, in another embodiment, the 45° angles are replaced with a single step. The steps on one end of the antenna go around the dielectric layer, interstitial the conductor, and the spacer layer. The same two steps are at the other ends of these layers.

In operation, when a feed wave is fed in from coaxial pin 1601, the wave travels outward concentrically oriented from coaxial pin 1601 in the area between ground plane 1602 and interstitial conductor 1603. The concentrically outgoing waves are reflected by sides 1607 and 1608 and travel inwardly in the area between interstitial conductor 1603 and RF array 1606. The reflection from the edge of the circular perimeter causes the wave to remain in phase (i.e., it is an in-phase reflection). The travelling wave is slowed by dielectric layer 1605. At this point, the travelling wave starts interacting and exciting with elements in RF array 1606 to obtain the desired scattering.

To terminate the travelling wave, a termination 1609 is included in the antenna at the geometric center of the antenna. In one embodiment, termination 1609 comprises a pin termination (e.g., a 50Ω pin). In another embodiment, termination 1609 comprises an RF absorber that terminates unused energy to prevent reflections of that unused energy back through the feed structure of the antenna. These could be used at the top of RF array 1606.

Figure 11:
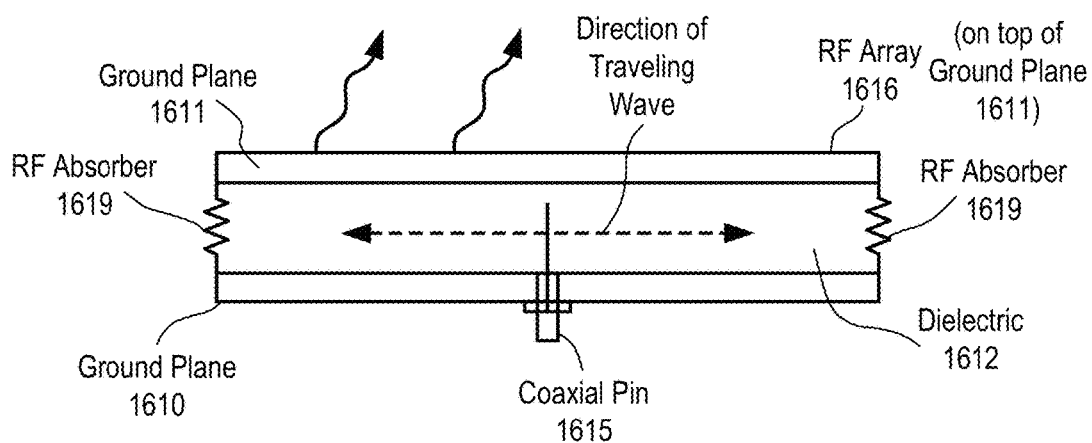
FIG. 11 illustrates another embodiment of the antenna system with an outgoing wave.

FIG. 11 illustrates another embodiment of the antenna system with an outgoing wave. Referring to FIG. 11, two ground planes 1610 and 1611 are substantially parallel to each other with a dielectric layer 1612 (e.g., a plastic layer, etc.) in between ground planes. RF absorbers 1619 (e.g., resistors) couple the two ground planes 1610 and 1611 together. A coaxial pin 1615 (e.g., 50Ω) feeds the antenna. An RF array 1616 is on top of dielectric layer 1612 and ground plane 1611.

In operation, a feed wave is fed through coaxial pin 1615 and travels concentrically outward and interacts with the elements of RF array 1616.

The cylindrical feed in both the antennas of FIGS. 10 and 11 improves the service angle of the antenna. Instead of a service angle of plus or minus forty-five degrees azimuth (±45° Az) and plus or minus twenty-five degrees elevation (±25° El), in one embodiment, the antenna system has a service angle of seventy-five degrees (75°) from the bore sight in all directions. As with any beam forming antenna comprised of many individual radiators, the overall antenna gain is dependent on the gain of the constituent elements, which themselves are angle-dependent. When using common radiating elements, the overall antenna gain typically decreases as the beam is pointed further off bore sight. At 75 degrees off bore sight, significant gain degradation of about 6 dB is expected.

Embodiments of the antenna having a cylindrical feed solve one or more problems. These include dramatically simplifying the feed structure compared to antennas fed with a corporate divider network and therefore reducing total required antenna and antenna feed volume; decreasing sensitivity to manufacturing and control errors by maintaining high beam performance with coarser controls (extending all the way to simple binary control); giving a more advantageous side lobe pattern compared to rectilinear feeds because the cylindrically oriented feed waves result in spatially diverse side lobes in the far field; and allowing polarization to be dynamic, including allowing left-hand circular, right-hand circular, and linear polarizations, while not requiring a polarizer.

Array of Wave Scattering Elements

RF array 1606 of FIG. 10 and RF array 1616 of FIG. 11 include a wave scattering subsystem that includes a group of patch antennas (i.e., scatterers) that act as radiators. This group of patch antennas comprises an array of scattering metamaterial elements.

In one embodiment, each scattering element in the antenna system is part of a unit cell that consists of a lower conductor, a dielectric substrate and an upper conductor that embeds a complementary electric inductive-capacitive resonator ("complementary electric LC" or "CELL") that is etched in or deposited onto the upper conductor.

In one embodiment, a liquid crystal (LC) is injected in the gap around the scattering element. Liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, the liquid crystal acts as an on/off switch for the transmission of energy from the guided wave to the CELC. When switched on, the CELC emits an electromagnetic wave like an electrically small dipole antenna.

Controlling the thickness of the LC increases the beam switching speed. A fifty percent (50%) reduction in the gap between the lower and the upper conductor (the thickness of the liquid crystal) results in a fourfold increase in speed. In another embodiment, the thickness of the liquid crystal results in a beam switching speed of approximately fourteen milliseconds (14 ms). In one embodiment, the LC is doped in a manner well-known in the art to improve responsiveness so that a seven millisecond (7 ms) requirement can be met.

The CELC element is responsive to a magnetic field that is applied parallel to the plane of the CELC element and perpendicular to the CELC gap complement. When a voltage is applied to the liquid crystal in the metamaterial scattering unit cell, the magnetic field component of the guided wave induces a magnetic excitation of the CELC, which, in turn, produces an electromagnetic wave in the same frequency as the guided wave.

The phase of the electromagnetic wave generated by a single CELC can be selected by the position of the CELC on the vector of the guided wave. Each cell generates a wave in phase with the guided wave parallel to the CELC. Because the CELCs are smaller than the wave length, the output wave has the same phase as the phase of the guided wave as it passes beneath the CELC.

In one embodiment, the cylindrical feed geometry of this antenna system allows the CELC elements to be positioned at forty-five-degree (45°) angles to the vector of the wave in the wave feed. This position of the elements enables control of the polarization of the free space wave generated from or received by the elements. In one embodiment, the CELCs are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the CELCs are implemented with patch antennas that include a patch co-located over a slot with liquid crystal between the two. In this respect, the metamaterial antenna acts like a slotted (scattering) wave guide. With a slotted wave guide, the phase of the output wave depends on the location of the slot in relation to the guided wave.

Cell Placement

Figure 12:
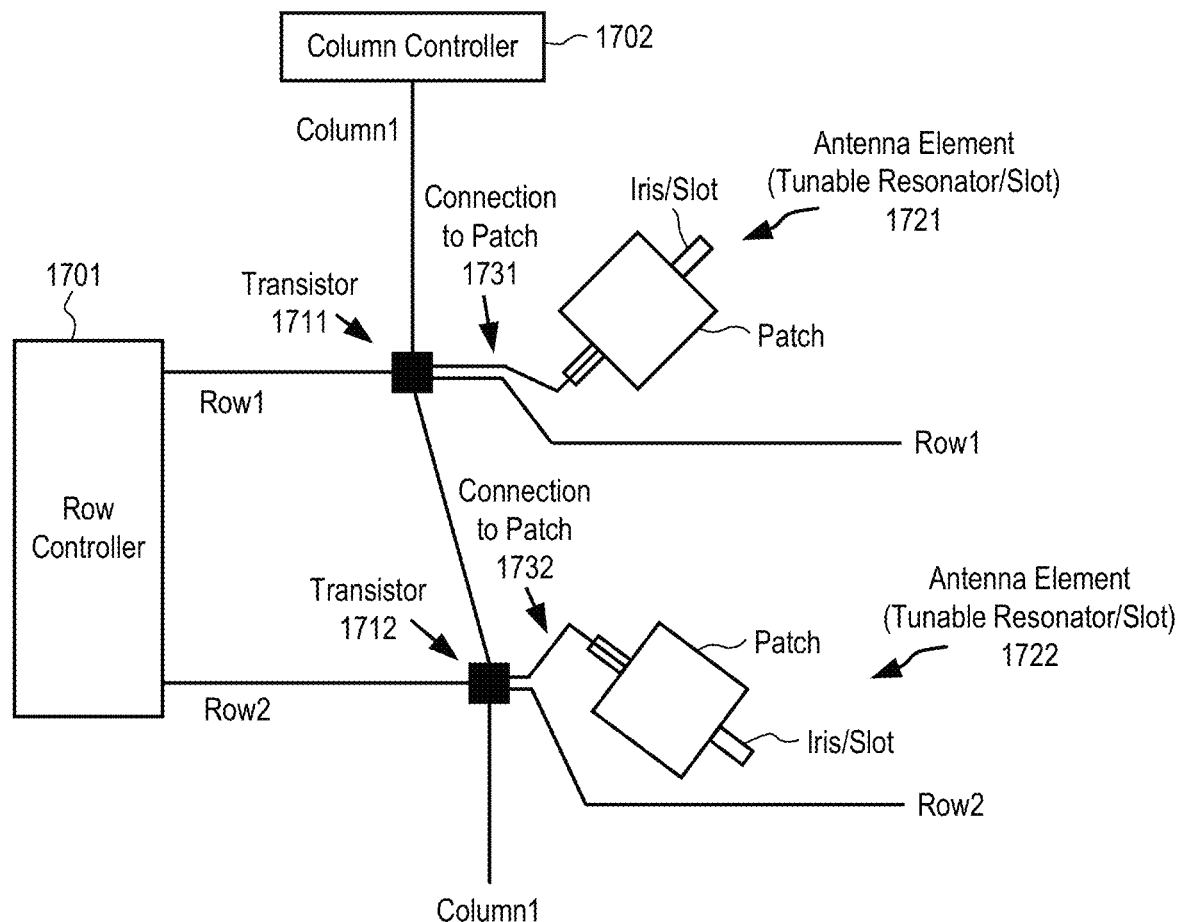
FIG. 12 illustrates one embodiment of the placement of matrix drive circuitry with respect to antenna elements.

In one embodiment, the antenna elements are placed on the cylindrical feed antenna aperture in a way that allows for a systematic matrix drive circuit. The placement of the cells includes placement of the transistors for the matrix drive. FIG. 12 illustrates one embodiment of the placement of matrix drive circuitry with respect to antenna elements. Referring to FIG. 12, row controller 1701 is coupled to transistors 1711 and 1712, via row select signals Row1 and Row2, respectively, and column controller 1702 is coupled to transistors 1711 and 1712 via column select signal Column1. Transistor 1711 is also coupled to antenna element 1721 via connection to patch 1731, while transistor 1712 is coupled to antenna element 1722 via connection to patch 1732.

In an initial approach to realize matrix drive circuitry on the cylindrical feed antenna with unit cells placed in a non-regular grid, two steps are performed. In the first step, the cells are placed on concentric rings and each of the cells is connected to a transistor that is placed beside the cell and acts as a switch to drive each cell separately. In the second step, the matrix drive circuitry is built in order to connect every transistor with a unique address as the matrix drive approach requires. Because the matrix drive circuit is built by row and column traces (similar to LCDs) but the cells are placed on rings, there is no systematic way to assign a unique address to each transistor. This mapping problem results in very complex circuitry to cover all the transistors and leads to a significant increase in the number of physical traces to accomplish the routing. Because of the high density of cells, those traces disturb the RF performance of the antenna due to coupling effect. Also, due to the complexity of traces and high packing density, the routing of the traces cannot be accomplished by commercially available layout tools.

In one embodiment, the matrix drive circuitry is pre-defined before the cells and transistors are placed. This ensures a minimum number of traces that are necessary to drive all the cells, each with a unique address. This strategy reduces the complexity of the drive circuitry and simplifies the routing, which subsequently improves the RF performance of the antenna.

More specifically, in one approach, in the first step, the cells are placed on a regular rectangular grid composed of rows and columns that describe the unique address of each cell. In the second step, the cells are grouped and transformed to concentric circles while maintaining their address and connection to the rows and columns as defined in the first step. A goal of this transformation is not only to put the cells on rings but also to keep the distance between cells and the distance between rings constant over the entire aperture. In order to accomplish this goal, there are several ways to group the cells.

Figure 13:
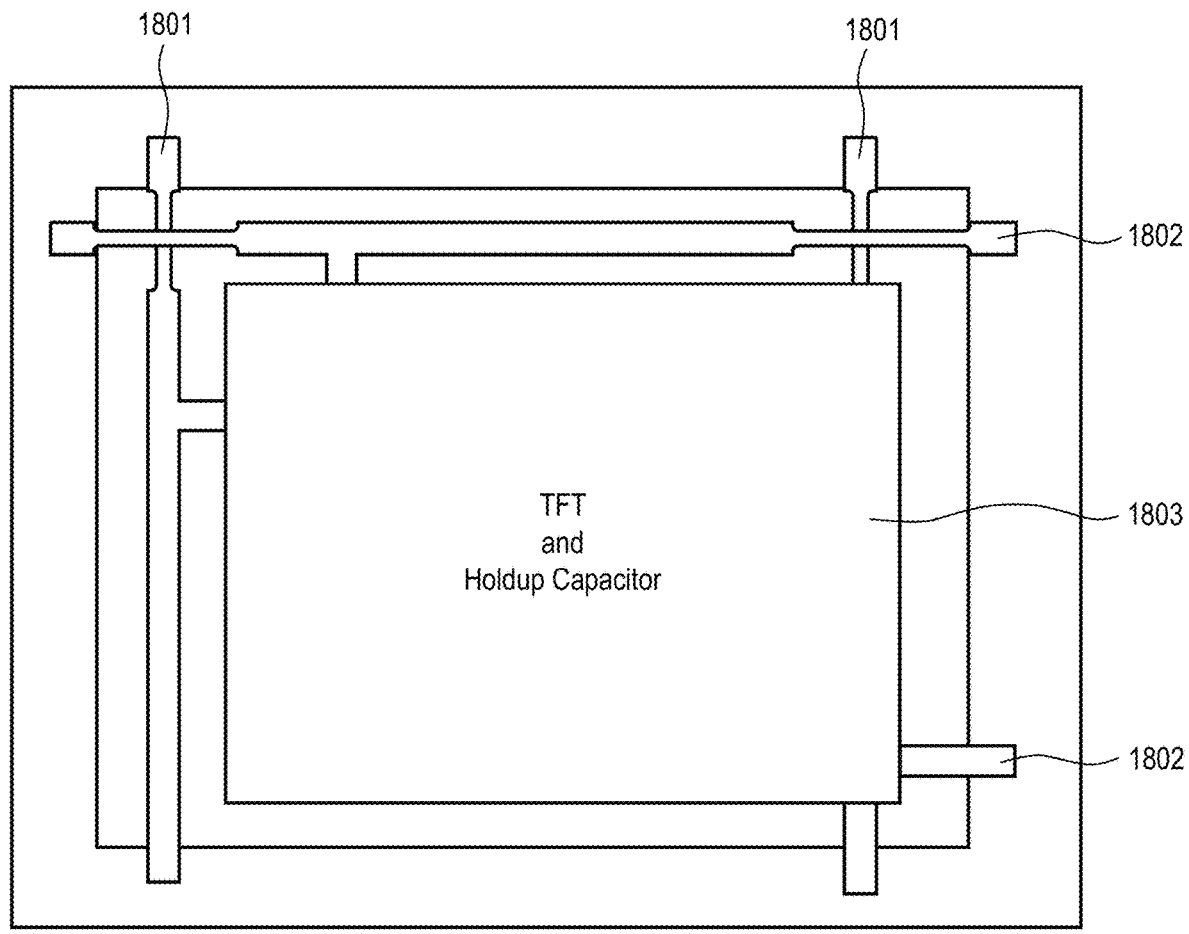
FIG. 13 illustrates one embodiment of a TFT package.

In one embodiment, a TFT package is used to enable placement and unique addressing in the matrix drive. FIG. 13 illustrates one embodiment of a TFT package. Referring to FIG. 13, a TFT and a hold capacitor 1803 is shown with input and output ports. There are two input ports connected to traces 1801 and two output ports connected to traces 1802 to connect the TFTs together using the rows and columns. In one embodiment, the row and column traces cross in 90° angles to reduce, and potentially minimize, the coupling between the row and column traces. In one embodiment, the row and column traces are on different layers.

An Example of a Full Duplex Communication System

Figure 14:
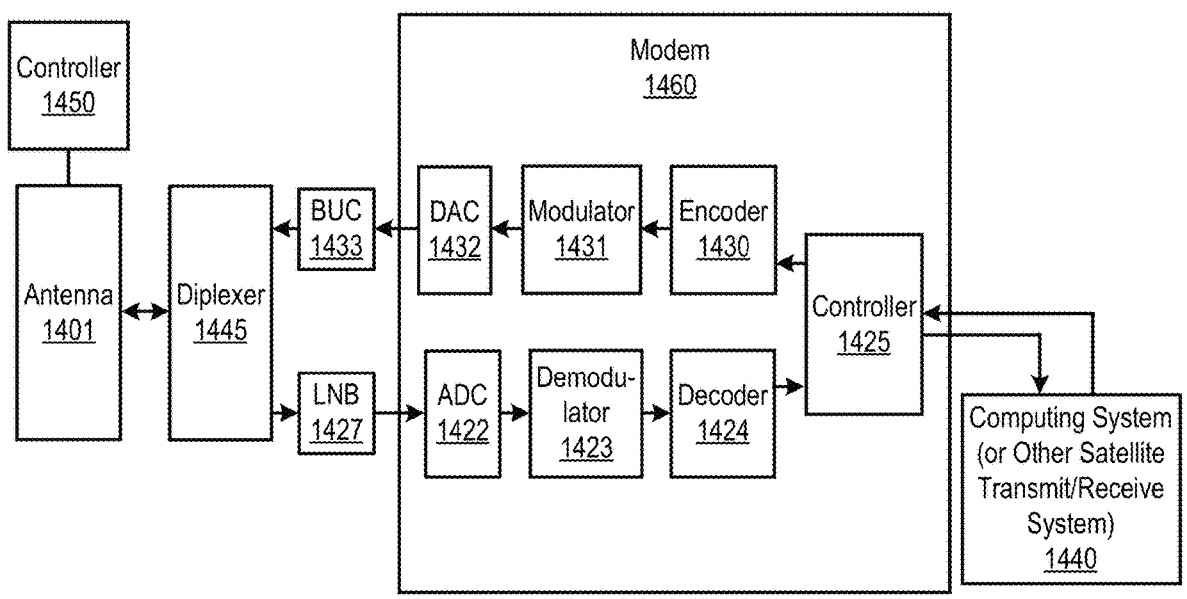
FIG. 14 is a block diagram of another embodiment of a communication system having simultaneous transmit and receive paths.

In another embodiment, the combined antenna apertures are used in a full duplex communication system. FIG. 14 is a block diagram of another embodiment of a communication system having simultaneous transmit and receive paths. While only one transmit path and one receive path are shown, the communication system may include more than one transmit path and/or more than one receive path.

Referring to FIG. 14, antenna 1401 includes two spatially interleaved antenna arrays operable independently to transmit and receive simultaneously at different frequencies as described above. In one embodiment, antenna 1401 is coupled to diplexer 1445. The coupling may be by one or more feeding networks. In one embodiment, in the case of a radial feed antenna, diplexer 1445 combines the two signals and the connection between antenna 1401 and diplexer 1445 is a single broad-band feeding network that can carry both frequencies.

Diplexer 1445 is coupled to a low noise block down converter (LNBs) 1427, which performs a noise filtering function and a down conversion and amplification function in a manner well-known in the art. In one embodiment, LNB 1427 is in an out-door unit (ODU). In another embodiment, LNB 1427 is integrated into the antenna apparatus. LNB 1427 is coupled to a modem 1460, which is coupled to computing system 1440 (e.g., a computer system, modem, etc.).

Modem 1460 includes an analog-to-digital converter (ADC) 1422, which is coupled to LNB 1427, to convert the received signal output from diplexer 1445 into digital format. Once converted to digital format, the signal is demodulated by demodulator 1423 and decoded by decoder 1424 to obtain the encoded data on the received wave. The decoded data is then sent to controller 1425, which sends it to computing system 1440.

Modem 1460 also includes an encoder 1430 that encodes data to be transmitted from computing system 1440. The encoded data is modulated by modulator 1431 and then converted to analog by digital-to-analog converter (DAC) 1432. The analog signal is then filtered by a BUC (up-convert and high pass amplifier) 1433 and provided to one port of diplexer 1445. In one embodiment, BUC 1433 is in an out-door unit (ODU).

Diplexer 1445 operating in a manner well-known in the art provides the transmit signal to antenna 1401 for transmission.

Controller 1450 controls antenna 1401, including the two arrays of antenna elements on the single combined physical aperture.

The communication system would be modified to include the combiner/arbiter described above. In such a case, the combiner/arbiter after the modem but before the BUC and LNB.

Note that the full duplex communication system shown in FIG. 14 has a number of applications, including but not limited to, internet communication, vehicle communication (including software updating), etc.

There is a number of example embodiments described herein.

Example 1 is antenna comprising: a plurality of antenna modules tiled together and configured to form one metasurface antenna with an array of surface scattering metamaterial antenna elements; and a feed network comprising a plurality of feed points coupled to the plurality of antenna modules to supply the modules with a feed wave.

Example 2 is the antenna of example 1 that may optionally include a power divider/combiner network to combine signals received by the plurality of antenna modules and divide the transmitted power among antenna modules in the plurality of antenna modules.

Example 3 is the antenna of example 1 that may optionally include a digital combiner coupled to the plurality of antenna modules to digitally combine signals from the plurality of antenna modules; and an analog divider network to divide transmitted power among antenna modules in the plurality of antenna modules.

Example 4 is the antenna of example 1 that may optionally include that each of the plurality of antenna modules comprises a plurality of surface scattering metamaterial receive antenna elements and a plurality of surface scattering metamaterial transmit antenna elements, and further comprising a controller coupled to the plurality of antenna modules to generate control patterns for the plurality of modules, wherein each control pattern for the plurality of surface scattering metamaterial receive antenna elements for each antenna module is independent from other antenna modules in the plurality of modules to enable each of the plurality of antenna modules to perform beam forming, and further wherein the controller is operable to generate a control pattern across multiple a portion of antenna modules of the plurality of antenna modules for the surface scattering metamaterial transmit antenna elements on individual antenna modules to enable the multiple antenna modules to participate in beamforming at an array level.

Example 5 is the antenna of example 1 that may optionally include that a time-delay (TTD) component coupled to each antenna module to compensate for the time delay associated with angle of arrival delay.

Example 6 is the antenna of example 5 that may optionally include that TTD component is operable to perform compensation by performing adjustments in software to delay the signals from the antenna module to compensate for the delay of arrival.

Example 7 is the antenna of example 6 that may optionally include that the TTD component applies the time delay in baseband, at intermediate frequency (IF), or at RF.

Example 8 is the antenna of example 1 that may optionally include that antenna modules of the plurality of antenna modules are hexagonal-shaped or rectangular-shaped center-fed antenna modules.

Example 9 is the antenna of example 1 that may optionally include that the plurality of antenna modules are part of one substrate.

Example 10 is the antenna of example 1 that may optionally include edge absorbers under edges of antenna modules of the plurality of modules for terminating a feed wave propagating in a waveguide beneath each antenna module.

Example 11 is an antenna comprising: a plurality of antenna modules tiled together and configured to form one metasurface antenna with an array of surface scattering metamaterial antenna elements, wherein each of the plurality of antenna modules comprises a plurality of surface scattering metamaterial receive antenna elements and a plurality of surface scattering metamaterial transmit antenna elements; a feed network comprising a plurality of feed points coupled to the plurality of antenna modules to supply the modules with a feed wave, wherein the feed network comprises a digital combiner coupled to the plurality of antenna modules to digitally combine signals from the plurality of antenna modules, and an analog divider network to divide transmitted power among antenna modules in the plurality of antenna modules; and a controller coupled to the plurality of antenna modules to generate control patterns for the plurality of modules, wherein each control pattern for the plurality of surface scattering metamaterial receive antenna elements for each antenna module is independent from other antenna modules in the plurality of modules to enable each of the plurality of antenna modules to perform beam forming and further wherein the controller is operable to generate a control pattern across multiple antenna modules of the plurality of antenna modules for the surface scattering metamaterial transmit antenna elements on individual antenna modules to enable the multiple antenna modules to participate in beamforming at an array level.

Example 12 is the antenna of example 11 that may optionally include a true time-delay (TTD) component coupled to each antenna module to compensate for the time delay associated with angle of arrival delay.

Example 13 is the antenna of example 12 that may optionally include that the TTD component is operable to perform compensation by performing adjustments in software to delay the signals from the antenna module to compensate for the delay of arrival.

Example 14 is the antenna of example 13 that may optionally include that the TTD component applies the time delay in the baseband, at intermediate frequency (IF), or at RF.

Example 15 is the antenna of example 11 that may optionally include that antenna modules of the plurality of antenna modules are hexagonal-shaped or rectangular-shaped center-fed antenna modules.

Example 16 is the antenna of example 11 that may optionally include that the plurality of antenna modules are part of one substrate.

Example 17 is the antenna of example 11 that may optionally include edge absorbers under edges of antenna modules of the plurality of modules for terminating a feed wave propagating in a waveguide beneath each antenna module.

Example 18 is an antenna comprising: a plurality of antenna modules tiled together and configured to form one metasurface antenna with an array of surface scattering metamaterial antenna elements in an area of a first size; and a feed network comprising a plurality of feed points coupled to the plurality of antenna modules to supply the modules with a feed wave to reduce guide length associated with the antenna to a fraction of guide length associated with the metasurface antenna has the metasurface antenna consisting of a single module covering the first sized area of the first size, the metasurface antenna comprising the plurality of antenna modules having a higher instantaneous bandwidth than the metasurface antenna consisting of a single module covering the first sized area.

Example 19 is the antenna of example 18 that may optionally include a digital combiner coupled to the plurality of antenna modules to digitally combine signals from the plurality of antenna modules, and an analog divider network to divide transmitted power among antenna modules in the plurality of antenna modules.

Example 20 is the antenna of example 18 that may optionally include that each of the plurality of antenna modules comprises a plurality of surface scattering metamaterial receive antenna elements and a plurality of surface scattering metamaterial transmit antenna elements, and further comprising a controller coupled to the plurality of antenna modules to generate control patterns for the plurality of modules, wherein each control pattern for the plurality of surface scattering metamaterial receive antenna elements for each antenna module is independent from other antenna modules in the plurality of modules to enable each of the plurality of antenna modules to perform beam forming and further wherein the controller is operable to generate a control pattern across multiple antenna modules of the plurality of antenna modules for the surface scattering metamaterial transmit antenna elements on individual antenna modules to enable the multiple antenna modules to participate in beamforming at an array level.

Example 21 is an antenna comprising: a plurality of antenna modules tiled together and configured to form one flat-panel antenna with an array of antenna elements, wherein each of the plurality of antenna modules comprises a plurality of receive antenna elements and a plurality of transmit antenna elements; a feed network comprising a plurality of feed points coupled to the plurality of antenna modules to supply the modules with a feed wave, wherein the feed network comprises a digital combiner coupled to the plurality of antenna modules to digitally combine signals from the plurality of antenna modules, and an analog divider network to divide transmitted power among antenna modules in the plurality of antenna modules; and a controller coupled to the plurality of antenna modules to generate control patterns for the plurality of modules, wherein each control pattern for the plurality of receive antenna elements for each antenna module is independent from other antenna modules in the plurality of modules to enable each of the plurality of antenna modules to perform beam forming, and further wherein the controller is operable to generate a control pattern across multiple antenna modules of the plurality of antenna modules for the transmit antenna elements on individual antenna modules to enable the multiple antenna modules to participate in beamforming at an array level.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. An antenna comprising:
   a plurality of antenna modules tiled together and configured to form one metasurface antenna with an array of surface scattering metamaterial antenna elements;
   a feed network comprising a plurality of feed points coupled to the plurality of antenna modules, each feed point of the plurality of feed points to supply one of the antenna modules with a feed wave;
   a digital combiner coupled to the plurality of antenna modules to digitally combine signals from the plurality of antenna modules; and
   an analog divider network to divide transmitted power among antenna modules in the plurality of antenna modules.

2. The antenna of claim 1 further comprising a true time-delay (TTD) component coupled to each antenna module to compensate for a time delay associated with angle of arrival delay.

3. The antenna of claim 2 wherein the TTD component is operable to perform compensation by performing adjustments in software to delay the signals from said each antenna module to compensate for the arrival delay.

4. The antenna of claim 3 wherein the TTD component applies the time delay in baseband, at intermediate frequency (IF), or at radio-frequency (RF).

5. The antenna of claim 1 wherein antenna modules of the plurality of antenna modules are hexagonal-shaped or rectangular-shaped center-fed antenna modules.

6. The antenna of claim 1 wherein the plurality of antenna modules are part of one substrate.

7. An antenna comprising:
   a plurality of antenna modules tiled together and configured to form one metasurface antenna with an array of surface scattering metamaterial antenna elements, wherein each of the plurality of antenna modules comprises a plurality of surface scattering metamaterial receive antenna elements and a plurality of surface scattering metamaterial transmit antenna elements; and
   a feed network comprising a plurality of feed points coupled to the plurality of antenna modules, each feed point of the plurality of feed points to supply one of the antenna modules with a feed wave; and
   a controller coupled to the plurality of antenna modules to generate control patterns for the plurality of modules, wherein each control pattern for the plurality of surface scattering metamaterial receive antenna elements for each antenna module is independent from other antenna modules in the plurality of modules to enable each of the plurality of antenna modules to perform beam forming, and
   further wherein the controller is operable to generate a control pattern across multiple antenna modules of the plurality of antenna modules for the surface scattering metamaterial transmit antenna elements on individual antenna modules to enable the multiple antenna modules to participate in beamforming at an array level.

8. An antenna comprising:
   a plurality of antenna modules tiled together and configured to form one metasurface antenna with an array of surface scattering metamaterial antenna elements; and
   a feed network comprising a plurality of feed points coupled to the plurality of antenna modules, each feed point of the plurality of feed points to supply one of the antenna modules with a feed wave; and
   edge absorbers under edges of antenna modules of the plurality of modules for terminating a feed wave propagating in a waveguide beneath each antenna module.

9. An antenna comprising:
   a plurality of antenna modules tiled together and configured to form one metasurface antenna with an array of surface scattering metamaterial antenna elements, wherein each of the plurality of antenna modules comprises a plurality of surface scattering metamaterial receive antenna elements and a plurality of surface scattering metamaterial transmit antenna elements;
   a feed network comprising a plurality of feed points coupled to the plurality of antenna modules to supply the modules with a feed wave, wherein the feed network comprises
      a digital combiner coupled to the plurality of antenna modules to digitally combine signals from the plurality of antenna modules, and
      an analog divider network to divide transmitted power among antenna modules in the plurality of antenna modules; and
   a controller coupled to the plurality of antenna modules to generate control patterns for the plurality of modules, wherein each control pattern for the plurality of surface scattering metamaterial receive antenna elements for each antenna module is independent from other antenna modules in the plurality of modules to enable each of the plurality of antenna modules to perform beam forming and further wherein the controller is operable to generate a control pattern across multiple antenna modules of the plurality of antenna modules for the surface scattering metamaterial transmit antenna elements on individual antenna modules to enable the multiple antenna modules to participate in beamforming at an array level.

10. The antenna of claim 9 further comprising a true time-delay (TTD) component coupled to each antenna module to compensate for a time delay associated with angle of arrival delay.

11. The antenna of claim 10 wherein the TTD component is operable to perform compensation by performing adjustments in software to delay the signals from said each antenna module to compensate for the arrival delay.

12. The antenna of claim 11 wherein the TTD component applies the time delay at baseband, at intermediate frequency (IF), or at radio-frequency (RF).

13. The antenna of claim 9 wherein antenna modules of the plurality of antenna modules are hexagonal-shaped or rectangular-shaped center-fed antenna modules.

14. The antenna of claim 9 wherein the plurality of antenna modules are part of one substrate.

15. The antenna of claim 9 further comprising edge absorbers under edges of antenna modules of the plurality of modules for terminating a feed wave propagating in a waveguide beneath each antenna module.

16. An antenna comprising:
a plurality of antenna modules tiled together and configured to form one metasurface antenna with an array of surface scattering metamaterial antenna elements in an area of a first size; and
a feed network comprising a plurality of feed points coupled to the plurality of antenna modules to supply the modules with a feed wave to reduce guide length associated with the antenna to a fraction of guide length associated with the metasurface antenna has the metasurface antenna consisting of a single module covering the area of the first size, the metasurface antenna comprising the plurality of antenna modules having a higher instantaneous bandwidth than the metasurface antenna consisting of a single module covering the area.

17. The antenna of claim 16 further comprising:
a digital combiner coupled to the plurality of antenna modules to digitally combine signals from the plurality of antenna modules, and
an analog divider network to divide transmitted power among antenna modules in the plurality of antenna modules.

18. The antenna of claim 16 wherein each of the plurality of antenna modules comprises a plurality of surface scattering metamaterial receive antenna elements and a plurality of surface scattering metamaterial transmit antenna elements, and further comprising
a controller coupled to the plurality of antenna modules to generate control patterns for the plurality of modules, wherein each control pattern for the plurality of surface scattering metamaterial receive antenna elements for each antenna module is independent from other antenna modules in the plurality of modules to enable each of the plurality of antenna modules to perform beam forming and further wherein the controller is operable to generate a control pattern across multiple antenna modules of the plurality of antenna modules for the surface scattering metamaterial transmit antenna elements on individual antenna modules to enable the multiple antenna modules to participate in beamforming at an array level.

19. An antenna comprising:
a plurality of antenna modules tiled together and configured to form one flat-panel antenna with an array of antenna elements, wherein each of the plurality of antenna modules comprises a plurality of receive antenna elements and a plurality of transmit antenna elements;
a feed network comprising a plurality of feed points coupled to the plurality of antenna modules to supply the modules with a feed wave, wherein the feed network comprises
a digital combiner coupled to the plurality of antenna modules to digitally combine signals from the plurality of antenna modules, and
an analog divider network to divide transmitted power among antenna modules in the plurality of antenna modules; and
a controller coupled to the plurality of antenna modules to generate control patterns for the plurality of modules, wherein each control pattern for the plurality of receive antenna elements for each antenna module is independent from other antenna modules in the plurality of modules to enable each of the plurality of antenna modules to perform beam forming, and further wherein the controller is operable to generate a control pattern across multiple antenna modules of the plurality of antenna modules for the transmit antenna elements on individual antenna modules to enable the multiple antenna modules to participate in beamforming at an array level.

* * * * *